United States Patent
Okada et al.

(10) Patent No.: US 10,236,133 B2
(45) Date of Patent: *Mar. 19, 2019

(54) LITHIUM ION CAPACITOR

(71) Applicant: Asahi Kasei Kabushiki Kaisha, Tokyo (JP)

(72) Inventors: Nobuhiro Okada, Tokyo (JP); Osamu Saito, Tokyo (JP); Kensuke Niimura, Tokyo, PA (US)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 14/429,519

(22) PCT Filed: Sep. 18, 2013

(86) PCT No.: PCT/JP2013/075159
§ 371 (c)(1),
(2) Date: Mar. 19, 2015

(87) PCT Pub. No.: WO2014/046131
PCT Pub. Date: Mar. 27, 2014

(65) Prior Publication Data
US 2015/0243449 A1 Aug. 27, 2015

(30) Foreign Application Priority Data

Sep. 20, 2012 (JP) .................................. 2012-207509
Sep. 20, 2012 (JP) .................................. 2012-207518

(51) Int. Cl.
*H01G 11/06* (2013.01)
*H01G 11/52* (2013.01)
(Continued)

(52) U.S. Cl.
CPC .............. *H01G 11/06* (2013.01); *H01G 11/16* (2013.01); *H01G 11/28* (2013.01); *H01G 11/32* (2013.01);
(Continued)

(58) Field of Classification Search
CPC ........ H01G 11/06; H01G 11/52; H01G 11/16; H01G 11/84; H01G 11/78; H01G 11/32; H01G 11/28; H01G 11/24
See application file for complete search history.

(56) References Cited

U.S. PATENT DOCUMENTS 5,744,258 A * 4/1998 Bai .......................... H01M 4/04
429/209
8,279,580 B2 * 10/2012 Zhong ................... C04B 35/532
361/301.1

(Continued)

FOREIGN PATENT DOCUMENTS

JP 2001351688 A * 12/2001
JP 2003-217674 A 7/2003

(Continued)

OTHER PUBLICATIONS

Translation of International Preliminary Report on Patentability and Written Opinion issued in corresponding International Patent Application No. PCT/JP2013/075159 dated Apr. 2, 2015.

(Continued)

*Primary Examiner* — David M Sinclair
(74) *Attorney, Agent, or Firm* — Morgan, Lewis & Bockius LLP

(57) ABSTRACT

Provided is a lithium ion capacitor comprising, accommodated within an outer casing: an electrode stack obtained by stacking a negative electrode in which a negative-electrode active material layer including a carbon material as the negative-electrode active material is disposed on a negative- (Continued)

electrode collector, a separator comprising a polyethylene-containing polyolefin resin, and a positive electrode in which a positive-electrode active material layer including a positive-electrode active material layer comprising a carbon material or a carbonaceous material is disposed on a positive-electrode collector; and a non-aqueous electrolyte solution including a lithium ion-containing electrolyte.

11 Claims, 3 Drawing Sheets

(51) Int. Cl.
    *H01G 11/32* (2013.01)
    *H01G 11/28* (2013.01)
    *H01G 11/16* (2013.01)
    *H01G 11/78* (2013.01)
    *H01G 11/84* (2013.01)
    *H01G 11/86* (2013.01)
    *H01G 11/24* (2013.01)

(52) U.S. Cl.
    CPC ............ *H01G 11/52* (2013.01); *H01G 11/78* (2013.01); *H01G 11/84* (2013.01); *H01G 11/86* (2013.01); *H01G 11/24* (2013.01); *Y02E 60/13* (2013.01); *Y02T 10/7022* (2013.01); *Y10T 156/10* (2015.01)

(56) References Cited

U.S. PATENT DOCUMENTS

| | | | | |
|---|---|---|---|---|
| 8,503,162 B2* | 8/2013 | Seymour | ............... | H01G 11/36 361/502 |
| 8,900,755 B2* | 12/2014 | Liu | ............... | H01G 11/06 429/231.7 |
| 9,748,045 B2* | 8/2017 | Okada | ............... | H01G 11/06 |
| 2006/0263649 A1* | 11/2006 | Sohn | ............... | H01G 9/14 429/7 |
| 2008/0193833 A1* | 8/2008 | Ohashi | ............... | B32B 27/32 429/129 |
| 2010/0124708 A1* | 5/2010 | Matsui | ............... | H01M 4/134 429/332 |
| 2010/0276631 A1* | 11/2010 | Mabuchi | ............... | H01M 4/133 252/182.1 |
| 2010/0316912 A1* | 12/2010 | Hashimoto | ............... | H01G 9/02 429/254 |
| 2012/0028100 A1* | 2/2012 | Maeda | ............... | H01M 2/16 429/139 |
| 2012/0050949 A1* | 3/2012 | Kim | ............... | H01G 11/24 361/505 |
| 2012/0099246 A1* | 4/2012 | Cho | ............... | H01G 11/32 361/505 |
| 2012/0115008 A1* | 5/2012 | Sano | ............... | H01M 2/1653 429/144 |
| 2013/0171500 A1* | 7/2013 | Xu | ............... | H01G 9/02 429/145 |
| 2014/0294714 A1* | 10/2014 | Haga | ............... | H01M 4/587 423/445 R |
| 2015/0311002 A1* | 10/2015 | Okada | ............... | H01G 11/06 429/163 |
| 2015/0371788 A1* | 12/2015 | Okada | ............... | H01G 11/24 361/502 |
| 2017/0283565 A1* | 10/2017 | Ono | ............... | C08J 5/04 |

FOREIGN PATENT DOCUMENTS

| | | | |
|---|---|---|---|
| JP | 2005-039139 A | | 2/2005 |
| JP | 2006321841 A | * | 11/2006 |
| JP | 2011-204903 A | | 10/2011 |
| JP | 2012-33399 A | | 2/2012 |
| JP | 2012-072263 A | | 4/2012 |
| JP | 2012-074467 A | | 4/2012 |
| JP | 2012-102199 A | | 5/2012 |

OTHER PUBLICATIONS

International Search Report issued in corresponding International Patent Application No. PCT/JP2013/075159 dated Dec. 24, 2013.
The Supplementary European Search Report issued in European Patent Application No. 13839901.9 dated Sep. 2, 2015.

* cited by examiner

LITHIUM ION CAPACITOR

TECHNICAL FIELD

The present invention relates to a lithium ion capacitor having high capacity, output, and safety.

BACKGROUND ART

Recently, from the viewpoint of effective utilization of energy aimed at global environmental conservation and effective utilization of resources, a nighttime power storage system, a home-use distributed electrical storage system based on photovoltaic power generation technology, and an electrical storage system for an electric vehicle, have attracted attention.

In these electrical storage systems, the first requirement is that energy density of the electrical storage elements is high. As one of the more popular electrical storage elements having a high degree of energy density and capable of meeting other storage requirements, lithium ion batteries have been developed and utilized on a large scale.

The second requirement is the capacity for high output. For example, in a combination of a highly efficient engine and an electrical storage system (for example, a hybrid electric vehicle), or in a combination of a fuel cell and an electrical storage system (for example, a fuel-cell electric vehicle), high output discharge characteristics are required from the electrical storage system, in order to achieve sufficient acceleration.

At the present time, as one type of a high output electrical storage element, electric double layer capacitors using activated carbon as an electrode, have been developed, and exhibit both high durability (in particular, cycle characteristics and high temperature storage characteristics), and output characteristics of about 0.5 to 1 KW/L. These electric double layer capacitors are considered to be the optimum electrical storage element in fields where the above-described high output is required; however, the energy density thereof is only about 1 to 5 Wh/L, and output duration time limit their use in practical applications.

On the other hand, a nickel-hydrogen battery that is currently adopted for use in hybrid electric vehicles has the same high output as that of the electric double layer capacitors, and has an energy density of about 160 Wh/L. However, research is being actively carried out to increase energy density and output thereof, as well as to further improve stability at high temperatures and increase durability.

In addition, as with lithium ion batteries, research continues toward realizing higher output.

For example, a lithium ion battery has been developed that is capable of providing a high output of over 3 kW/L, at a depth of discharge (i.e., a value indicating a state of charge in terms of percentage) of 50%; however, a lithium ion battery has been actually designed to suppress energy density equal to or less than 100 Wh/L, even though a lithium ion battery is identically characterized by the highest energy density (higher than 100 Wh/L).

In addition, durability thereof (in particular, cycle characteristics and high temperature storage characteristics) are inferior to that of the electric double layer capacitors. Therefore, in order to have practical durability, the lithium ion battery is usable only in a depth of discharge that is a narrower range than between 0 to 100%. Therefore, usable capacity in practice is reduced, and further research is being carried out to enhance durability.

As other examples, there have been proposed a microporous membrane made of polyolefin (for example polyethylene), having membrane resistance equal to or less than that of a conventional microporous membrane made of polyolefin, together with high porosity (also referred to as "high void content"); and a non-aqueous electrolytic solution-type secondary battery provided with a microporous membrane made of polyolefin (refer to PATENT LITERATURE 1).

Although practical application of the electrical storage element having high output density, high energy density and durability, as described above, has been required, the above-described existing electrical storage element has advantage and disadvantage. Accordingly, a new electrical storage element satisfying these technological requirements has been required, and as a strong candidate thereof, development of the electrical storage element which is referred to as a lithium ion capacitor has been active in recent years.

The lithium ion capacitor is one type of an electrical storage element (i.e., a non-aqueous lithium-type electrical storage element) using a non-aqueous electrolytic solution including a lithium ion-containing electrolyte, and is the electrical storage element carrying out charge-discharge by a non-faradaic reaction based on adsorption/desorption of a negative ion similar to that in the electric double layer capacitor, in a positive electrode, and by a faradaic reaction based on intercalation/deintercalation of a lithium ion similar to that in the lithium ion battery, in a negative electrode.

As described above, in the electric double layer capacitors carrying out charge-discharge by the non-faradaic reaction in both of the positive electrode/the negative electrode, output characteristics is superior but energy density is low. On the other hand, in the lithium ion battery, which is a secondary battery carrying out charge-discharge by the faradaic reaction in both of the positive electrode/the negative electrode, energy density is superior but output characteristics is inferior. A lithium ion capacitor is a novel electrical storage element which can achieve both superior output characteristics and high energy density, by carrying out charge-discharge based on the non-faradaic reaction in the positive electrode and based on the faradaic reaction in the negative electrode.

Applications using the lithium ion capacitor include electricity storage for railways or construction machines, and automobiles. Since operating environments are severe in these applications, it is necessary to have superior temperature characteristics. Specifically, it is necessary to have high input/output characteristics at low temperature, or high cycle life characteristics at high temperature. As such a lithium ion capacitor, for example, there has been proposed a lithium ion capacitor consisting of a positive electrode having an positive electrode active material layer and a positive electrode current collector, a negative electrode having a negative electrode active material layer and a negative electrode current collector, a separator intervening between the positive electrode and the negative electrode, a non-aqueous electrolytic solution, and an outer casing, characterized in that the positive electrode active material layer contains an activated carbon, the negative electrode active material layer contains a carbon material capable of intercalation of a lithium ion, membrane thickness of the separator is 15 μm to 50 μm, and fluid resistance of the separator is 2.5 Ωcm² or less (refer to PATENT LITERATURE 2)

CITATION LIST

Patent Literature

PATENT LITERATURE 1: JP-A-2012-72263
PATENT LITERATURE 2: JP-A-2005-39139

SUMMARY OF INVENTION

Technical Problem

In the lithium ion battery, a microporous membrane made of a polyolefin, which is used as the separator, is the one having such function which is intended to clog (shut down) a pore when temperature is as high as about melting point of the microporous membrane, caused by runaway of an electrochemical reaction occurring in the battery, and suppress progress of the still more electrochemical reaction. However, it has been difficult to prevent a short circuit of the negative electrode body and the positive electrode body of the relevant battery caused by melt deformation (melt down) of the microporous membrane, under environment where becoming further high temperature cannot be suppressed, although the electrochemical reaction has shut down, such as in the case where the battery was dropped in high temperature oil.

In contrast to this, because the lithium ion capacitor has lower energy density compared with the lithium ion battery, even if the electrochemical reaction occurs excessively, it has not been necessary to prevent it by shutting down of a microporous membrane made of a polyolefin, and thus a paper separator, which does not melt down at a higher temperature, has been mainly used.

However, the present inventors have found that there is a possibility of rupturing or igniting, depending on conditions, even in the lithium ion capacitor. Therefore, it is believed it is highly necessary to prevent rupturing or igniting as a higher capacity and higher output of the lithium ion capacitor progress.

Accordingly, a problem to be solved by the present invention is to provide the lithium ion capacitor having high energy density, high output and high safety.

Solution to Problem

The present inventors have intensively studied a way to solve the above-described problems and repeated the experiments, as a result, and have found that by adopting a separator satisfying the specific conditions to the lithium ion capacitor, the safety can be enhanced further by making positively a meltdown state at the initial stage of abnormally high temperature, and then by short-circuiting the electrode laminate and discharging, in the case where the outer casing is opened in a higher temperature and the electrolytic solution is gasified and jetted, and all of high energy density, high output and high safety can be satisfied, and have thus completed the present invention.

I.e., the present invention includes the following.
[1] A lithium ion capacitor comprising, having stored within an outer casing:
an electrode laminate obtained by laminating
a negative electrode body in which a negative electrode active material layer including a carbon material as a negative electrode active material is placed on a negative electrode current collector;
a separator comprising a polyolefin resin including a polyethylene; and
a positive electrode body in which a positive electrode active material layer including a positive electrode active material comprising any of a carbon material or a carbon compound material is placed on a positive electrode current collector; and
a non-aqueous electrolytic solution including a lithium ion-containing electrolyte,
wherein,
when said separator is maintained at 100° C. over 1 hour in an unconstrained state, said separator has a thermal shrinkage of 3% to 10% in a first direction, and a thermal shrinkage of 2% to 10% in a second direction which is orthogonal to the first direction,
wherein,
a larger electrode area which is any one of an area of the positive electrode active material layer of said positive electrode body and a negative electrode area of the negative electrode active material layer of said negative electrode body, and an area of said separator have a following relationship (separator area)>(electrode area); and wherein,
$X^1$ and $X^2$ are both 0.5 to 8.0,
wherein $X^1$ is calculated by the formula (1):

$$X^1 = \{L_1 \text{ or } L_1'/(A/2)\} \times 100$$

wherein, in an arbitrary straight line which is parallel to the first direction of said separator and makes any one of $L_1$ and $L_1'$ the shortest, in a top view, A is a length of a portion where said electrode area in said arbitrary straight line and said separator overlap, and $L_1$ and $L_1'$ are lengths of portions where said electrode area and said separator do not overlap; and
wherein $X^2$ is calculated by the formula (2):

$$X^2 = \{L_2 \text{ or } L_2'/(A/2)\} \times 100$$

wherein, in an arbitrary straight line which is parallel to the second direction of said separator and makes any one of $L_2$ and $L_2'$ the shortest, in a top view, B is a length of a portion where said electrode area in said arbitrary straight line and said separator overlap, and $L_2$ and $L_2'$ are lengths of portions where said electrode area and said separator do not overlap.
[2] The lithium ion capacitor according to [1], wherein pore size of said separator is 0.01 μm to 0.1 μm, and a number of pores is 100 pores/μm² to 250 pores/μm².
[3] The lithium ion capacitor according to [1] or [2], wherein Brugmann index measured and calculated using methyl ethyl carbonate of said separator as a probe molecule is 2.0 to 3.0.
[4] The lithium ion capacitor according to any one of [1] to [3], wherein membrane thickness of said separator is 5 μm to 35 μm, and porosity is 30% to 75%.
[5] The lithium ion capacitor according to any one of [1] to [4], wherein said separator is composed of polyethylene.
[6] The lithium ion capacitor according to any one of [1] to [5], wherein capacitance is 1000 F or more.
[7] The lithium ion capacitor according to any one of [1] to [6], wherein said negative electrode active material is formed by depositing a carbon material on the surface of an activated carbon, and is a composite porous material which satisfies $$0.010 \leq Vm1 \leq 0.250,$$

$$0.001 \leq Vm2 \leq 0.200 \text{ and}$$

$$1.5 \leq Vm1/Vm2 \leq 20.0$$

provided that, mesopore volume derived from a pore having a diameter of 20 Å to 500 Å calculated by a BJH method is Vm1 (cc/g), and micro-pore volume derived from a pore having a diameter of smaller than 20 Å calculated by a MP method is Vm2 (cc/g).

[8] The lithium ion capacitor according to any one of [1] to [7], wherein said positive electrode active material is activated carbon which satisfies $$0.3 < V1 \leq 0.8 \text{ and}$$

$$0.5 \leq V2 \leq 1.0,$$

provided that, mesopore volume derived from a pore having a diameter of 20 Å to 500 Å calculated by the BJH method is V1 (cc/g), and micro-pore volume derived from a pore having a diameter of smaller than 20 Å calculated by the MP method is V2 (cc/g), and a specific surface area measured by the BET method is 1500 m$^2$/g to 3000 m$^2$/g.

[9] A lithium ion capacitor comprising, stored within an outer casing:

an electrode laminate obtained by laminating a negative electrode body in which a negative electrode active material layer including a carbon material as a negative electrode active material is placed on a negative electrode current collector;

a separator comprising a polyolefin resin including a polyethylene; and a positive electrode body in which a positive electrode active material layer including a positive electrode active material comprising any of a carbon material and a carbon compound material, is placed on a positive electrode current collector; and a non-aqueous electrolytic solution including a lithium ion-containing electrolyte, characterized in that, said lithium ion capacitor has a short circuit starting temperature from 120° C. to 150° C. and a dead-short-circuit temperature from 120° C. to 150° C., and a difference between said short circuit starting temperature and said dead-short-circuit temperature is 20° C. or less, when said lithium ion capacitor is heated in an environment in which a temperature is increased from 30° C. or less at a rate of 5° C./min.

Advantageous Effects of Invention

The lithium ion capacitor relevant to the present invention has all of high energy density, high output, and high safety.

DESCRIPTION OF EMBODIMENTS

Figure 1:
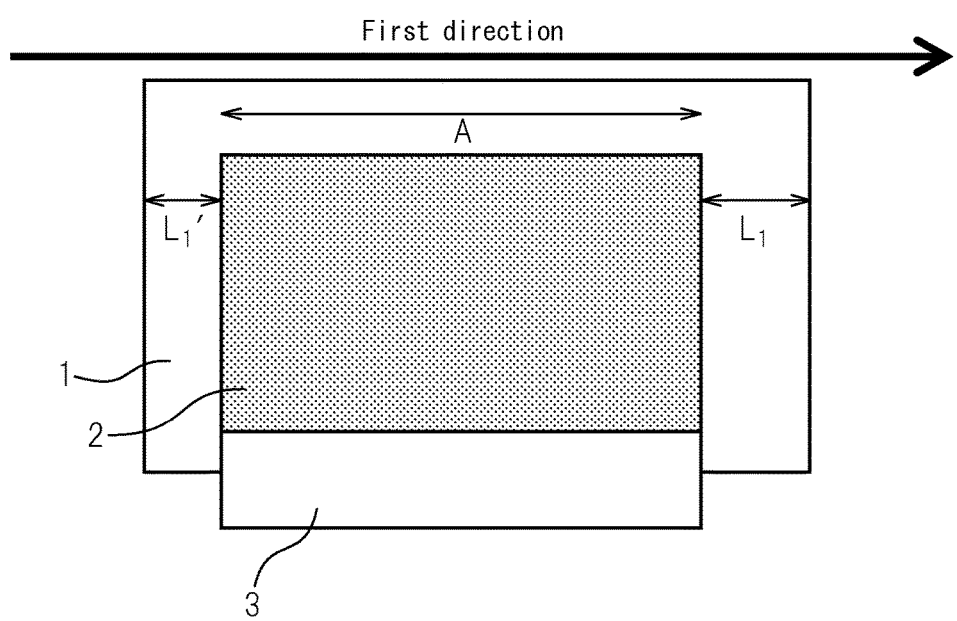
FIG. 1 is a schematic drawing for explaining relationship between electrode area, which is any one of an area of the positive electrode active material layer of the positive electrode body, or a negative electrode area of the negative electrode active material layer of the negative electrode body, and separator area.

Explanation will be given below in detail on an embodiment of the present invention.

In general, the lithium ion capacitor (hereafter it may also be referred to as "capacitor") has a positive electrode body, a separator, a negative electrode body, an electrolytic solution and an outer casing, as main constitution elements. In the embodiment of the present invention, a separator comprising a polyolefin resin including polyethylene, is used. Explanation will be given below in detail on each constitutional element.

<Positive Electrode Body>

The positive electrode body to be used in the capacitor of the present invention is the one in which a positive electrode active material layer is provided on a positive electrode current collector. The positive electrode current collector is preferably a metal foil, and still more preferably aluminum foil having a thickness of 1 to 100 μm.

The positive electrode active material layer contains the positive electrode active material and a binding agent, as well as conductive filler, as needed. As the positive electrode active material, an activated carbon is preferably used.

Kind of the activated carbon and a raw material thereof are not especially limited, however, it is preferable that the pore of the activated carbon is optimally controlled, in order to satisfy both high capacity (i.e., high energy density) and high output characteristics (i.e., high output density). Specifically, such an activated carbon is preferable that satisfies $$0.3 < V1 \leq 0.8 \text{ and}$$

$$0.5 \leq V2 \leq 1.0,$$

provided that mesopore volume derived from a pore having a diameter of 20 Å to 500 Å, calculated by a BJH method, is V1 (cc/g), and micro-pore volume derived from a pore having a diameter of smaller than 20 Å, calculated by a MP method, is V2 (cc/g), and specific surface area measured by the BET method is 1500 m$^2$/g to 4000 m=/g.

The mesopore volume V1 is preferably a value higher than 0.3 cc/g, from the viewpoint of increasing output characteristics, when the positive electrode material is incorporated into the electrical storage element, in addition, more preferably 0.8 cc/g or less, from the viewpoint of suppressing decrease in capacity of the electrical storage element. In addition, the above-described V1 is more preferably 0.35 cc/g to 0.7 cc/g, and still more preferably 0.4 cc/g to 0.6 cc/g.

On the other hand, the micro-pore volume V2 is preferably 0.5 cc/g or more to make specific surface area of the activated carbon larger, as well as to increase capacity, in addition, preferably 1.0 cc/g or less, in the view point of suppressing bulk of the activated carbon, increasing density as an electrode, and increasing capacity per unit volume. In addition, the above-described V2 is more preferably 0.6 cc/g to 1.0 cc/g, and still more preferably 0.8 cc/g to 1.0 cc/g.

In addition, ratio of the mesopore volume V1 to the micro-pore volume V2 (V1/V2) is preferably in a range of 0.3≤V1/V2≤0.9. I.e., it is preferable that V1/V2 is 0.3 or more from the viewpoint of increasing ratio of the mesopore volume to the micro-pore volume, in a degree of being capable of suppressing decrease in output characteristic, while acquiring high capacity, as well as it is preferable that V1/V2 is 0.9 or less, from the viewpoint of increasing ratio of the micro-pore volume to the mesopore volume, in a degree of being capable of suppressing decrease in capacity, while acquiring high output characteristics. In addition, more preferable range of V1/V2 is 0.4≤V1/V2≤0.7, and still more preferable range of V1/V2 is 0.55≤V1/V2≤0.7.

In the present invention, the micro-pore volume and the mesopore volume are values determined by the following methods. I.e., a sample is dried under vacuum at 500° C. for whole day and night to carry out measurement of an isotherm of absorption and desorption, using nitrogen as an adsorbent. Using the isotherm of the desorption in this case, the micro-pore volume and the mesopore volume are calculated by the MP method and the BJH method, respectively.

The MP method means a method for determining micro-pore volume, micro-pore area and micro-pore distribution, by utilization of "t-plot method" (B. C. Lippens, J. H. de Boer, J. Catalysis, 4319 (1965)), which is a method devised by M. Mikhail, Brunauer, and Bodor (R. S. Mikhail, S. Brunauer, E. E. Bodor, J. Colloid Interface Sci., 26,45 (1968)). In addition, the BJH method is a calculation method to be used generally in analysis of the mesopore, which was proposed by Barrett, Joyner, Halenda et. al. (E. P. Barrett, L. G. Joyner and P. Halenda, J. Amer. Chem. Soc., 73, 373 (1951)).

Average pore size of the activated carbon is preferably 17 Å or more, more preferably 18 Å or more, and most preferably 20 Å or more, from the viewpoint of maximizing the output. In addition, it is preferably 25 Å or less, from the viewpoint of maximizing the capacity. The average pore size described in the present description indicates the one determined by dividing the total pore volume per weight obtained by measuring each equilibrium adsorption amount of nitrogen gas under each relative pressure at liquid nitrogen temperature, by BET specific surface area.

The BET specific surface area of the activated carbon is preferably 1500 $m^2/g$ to 3000 $m^2/g$, and more preferably 1500 $m^2/g$ to 2500 $m^2/g$. In the case where the BET specific surface area is 1500 $m^2/g$ or more, good energy density is obtained easily, on the other hand, in the case where the BET specific surface area is 3000 $m^2/g$ or less, performance per electrode volume tends to be enhanced, because of no necessity of charging a large quantity of binder to keep strength of the electrode.

The activated carbon having the above-described characteristics can be obtained by using raw materials and a processing method which, for example, are explained below.

In the embodiments of the present invention, carbon sources to be used as the raw materials of the activated carbon are not especially limited, and include, for example, plant-based raw materials such as wood, wood flour, coconut shell, by-products at pulp manufacturing, bagasse, molasses; fossil-based raw materials such as peat, lignite, brown coal, bituminous coal, anthracite, components of petroleum distillation residue, petroleum pitch, coke, coal tar; various synthetic resins such as phenolic resin, vinyl chloride resin, vinyl acetate resin, melamine resin, urea resin, resorcinol resin, celluloid, epoxy resin, polyurethane resin, polyester resin, polyamide resin; synthetic rubber such as polybutylene, polybutadiene, polychloroprene; in addition to these, synthetic wood, synthetic pulp, and carbonized products thereof. Among these raw materials, plant-based raw materials such as coconut shell, wood flour, and carbonized products thereof are preferable, and carbonized product of coconut shell is particularly preferable.

As a method of carbonization and activation so as to convert these raw materials into the above-described active carbon, for example, a known method such as a fixed-bed method, a moving bed method, a fluidized bed method, a slurry method, a rotary kiln method can be employed.

As the carbonization method of these raw materials, there is included a method in which calcination is carried out at about 400 to about 700° C. (preferably at 450 to 600° C.) for about 30 minutes to about 10 hours, by using inert gas such as nitrogen, carbon dioxide, helium, argon, xenon, neon, carbon monoxide, flue gas, or mixed gas with other gas composing these inert gases as main components.

As an activation method of the carbonized product obtained by the above-described carbonization method, a gas activation method for carrying out calcination using activation gas of steam, carbon dioxide or oxygen, is preferably used. Among these, a method using steam or carbon dioxide, as activation gas, is preferable.

In this activation method, it is preferable to activate the above-described carbonized product by increasing temperature up to 800 to 1000° C. taking 3 to 12 hours (preferably 5 to 11 hours, and still more preferably 6 to 10 hours), while supplying activation gas in a rate of 0.5 to 3.0 kg/hr (preferably 0.7 to 2.0 kg/hr).

Still more, the above-described carbonized product may be subjected to primary activation in advance, prior to the activation treatment of the above-described carbonized product. In this primary activation, usually, a carbon material can be subjected to gas activation by calcination at a temperature lower than 900° C., using activation gas of steam, carbon dioxide or oxygen.

By combining appropriately calcination temperature and calcination time in the above-described carbonization method, as well as activation gas supply amount, temperature increasing rate, and highest activation temperature in the above-described activation method, an activated carbon having the above-described characteristics, which can be used in embodiment of the present invention, can be produced.

It is preferable that average particle size of the activated carbon is 1 to 20 μm. The average particle size described in the present description indicates particle size at point which an accumulated curve thereof is 50% (i.e., 50% diameter (Median diameter)), in determining the accumulated curve, assuming the total volume as 100%, when measuring the particle size distribution using a particle size distribution measuring device.

When the above-described average particle size is 1 μm or more, capacity per electrode volume tends to be high, because of high density of the active material layer. On the other hand, when the average particle size is 20 μm or less, conformity to high speed charge-discharge tends to be easy. Still more, the above-described average particle size is preferably 2 to 15 μm, and still more preferably 3 to 10 μm.

As a binding agent, for example, polyvinylidene fluoride (PVdF), polytetrafluoroethylene (PTFE), fluororubber or styrene-butadiene copolymer can be used. Mixing amount of the binding agent in the positive electrode active material layer is preferably 3 to 20% by weight, and still more preferably in a range of 5 to 15% by weight, to the positive electrode active material.

Into the above-described positive electrode active material layer, conductive filler composed of a conductive carbonaceous material, having higher electric conductivity as compared with the positive electrode active material, can be mixed, as needed, other than the activated carbon and the binding agent. As such a conductive filler, Ketjen black, acetylene black, vapor-grown carbon fiber, graphite, and a mixture thereof are preferable. Mixing amount of the conductive filler in the positive electrode active material layer is preferably 0 to 20% by weight, and still more preferably in a range of 1 to 15% by weight, to the positive electrode active material. It is preferable that the conductive filler are mixed, from the viewpoint of high input, however, the mixing amount of more than 20% by weight is not preferable, because content of the positive electrode active material in the positive electrode active material layer decreases, energy density per volume decreases. Thickness of the positive electrode active material layer is usually about 50 to 200 μm.

The positive electrode body is obtained by preparing the paste in which the positive electrode active material and the binding agent (and conductive filler, as needed) are dispersed in a solvent, and coating this paste on the positive electrode current collector, drying and pressing as needed. As an example of the coating method, there can be exemplified a bar coating method, a transfer roll method, a T-die method, and a screen printing method, and the coating method can be selected as appropriate in response to properties of the paste and coating thickness.

<Negative Electrode Body>

The negative electrode body to be used in the capacitor of the present invention is the one in which a negative electrode active material layer is provided on a negative electrode current collector. It is preferable that the negative electrode current collector is a metal foil, and more preferably a copper foil having a thickness of 1 to 100 μm.

The negative electrode active material layer contains the negative electrode active material and the binding agent, and contains the conductive filler as needed. The negative electrode active material is a carbon material which is capable of intercalation and deintercalation of a lithium ion. In addition, the negative electrode current collector can include other materials, which occlude and discharge a lithium ion, such as a lithium-titanium composite oxide or an electric conductive polymer, in addition to this carbon material. As the carbon material, for example, hard carbon, soft carbon, or a composite porous material can be included.

Still more preferably, the negative electrode active material is a composite porous material, in which a carbon material is deposited on the surface of an activated carbon, and is a material which satisfies $0.010 \leq Vm1 \leq 0.250$, $0.001 \leq Vm2 \leq 0.200$ and $1.5 \leq Vm1/Vm2 \leq 20.0$; provided that mesopore volume derived from a pore having a diameter of 20 Å to 500 Å, calculated by the BJH method, is $Vm1$ (cc/g), and micro-pore volume derived from a pore having a diameter of smaller than 20 Å, calculated by the MP method, is $Vm2$ (cc/g)), in the composite porous material.

The above-described negative electrode active material may be used alone, or may be used by mixing two or more kinds.

The above-described composite porous material can be obtained, for example, by heat treatment of the activated carbon and a carbon material precursor, in a state of mixing them coexisted.

With respect to the activated carbon to be used as a raw material of the above-described composite porous material, the raw material to obtain the activated carbon is not especially limited, as long as the obtained composite porous material performs the desired characteristics, and a commercial product obtained from various raw materials of a petroleum-based, a coal-based, a plant-based, or a polymer-based one can be used. In particular, it is preferable to use activated carbon powder having an average particle size of 1 μm to 15 μm. The average particle size is more preferably 2 μm to 10 μm. It should be noted that a measuring method of the above-described average particle size is the same as the measuring method used for average particle size of the activated carbon, which is the above-described positive electrode active material.

On the other hand, carbon material precursors to be used as the raw materials of the above-mentioned composite porous material is solid, liquid, or an organic material which is soluble in a solvent, which is capable of depositing the carbon material to the active carbon by heat treatment, and can include, for example, pitch, mesocarbon microbeads, coke, a synthetic resin such as a phenolic resin. Among these carbon material precursors, it is preferable to use pitch, from the viewpoint of production cost. Pitch can be roughly classified into petroleum pitch and coal pitch. For example, as petroleum pitch, there is exemplified, a distillation residue of crude oil, a flowable catalytic cracking residue (decant oil, etc.), bottom oil derived from a thermal cracker, ethylene tar obtained in the case of naphtha cracking.

In the case of using the above-described pitch, the composite porous material is obtained by depositing the carbon material on the activated carbon by subjecting volatile components or thermally decomposed components of the pitch to thermal reaction at the surface of the activated carbon. In this case, deposition of volatile components or thermally decomposed components of the pitch to the inside of a pore of the activated carbon proceeds at a temperature of about 200 to 500° C., and a conversion reaction of the deposited components to the carbon material proceeds at a temperature of 400° C. or more. Peak temperature in heat treatment is determined as appropriate, by characteristics of the obtained composite porous material, a thermal reaction pattern, and thermal reaction; however, it is preferably 400° C. or more, more preferably 450° C. to 1000° C., and still more preferably about 500 to 800° C. In addition, time for maintaining the peak temperature in heat treatment may be sufficient for 30 minutes to 10 hours, and is preferably 1 to 7 hours, and more preferably 2 to 5 hours. For example, in the case where heat treatment is carried out at the peak temperature of about 500 to 800° C. over 2 hours to 5 hours, it is considered that the carbon material deposited on the surface of the activated carbon is converted to a polycyclic aromatic hydrocarbon.

A manufacturing method for the above-described composite porous material includes, for example, a method for heat treating the activated carbon in inert gas atmosphere containing hydrocarbon gas volatilize from the carbon material precursor to deposit the carbon material in a vapor phase. In addition, a method for mixing the activated carbon and the carbon material precursor in advance and carrying out heat treatment; or a method for coating the carbon material precursor, dissolved in a solvent, on to the activated carbon, and after drying it, carrying out heat treatment is also possible.

The composite porous material is the one in which the carbon material is deposited onto the surface of the activated carbon, and pore distribution after the carbon material is deposited inside a pore of the activated carbon is important, and it is specified by the mesopore volume and the micro-pore volume. In the present invention, in particular, ratio of the mesopore volume/the micro-pore volume is important, together with absolute value of the mesopore volume and the micro-pore volume. I.e., in one aspect of the present invention, it is preferable that $0.010 \leq Vm1 \leq 0.250$, $0.001 \leq Vm2 \leq 0.200$ and $1.5 \leq Vm1/Vm2 \leq 20.0$, provided that mesopore volume derived from a pore having a diameter of 20 Å to 500 Å, calculated by the BJH method, is $Vm1$ (cc/g), and micro-pore volume derived from a pore having a diameter of smaller than 20 Å, calculated by the MP method, is $Vm2$ (cc/g), in the above-described composite porous material.

As for the mesopore volume $Vm1$, $0.010 \leq Vm1 \leq 0.225$ is more preferable, and $0.010 \leq Vm1 \leq 0.200$ is still more preferable. As for the micro-pore volume $Vm2$, $0.001 \leq Vm2 \leq 0.150$ is more preferable, and $0.001 \leq Vm2 \leq 0.100$ is still more preferable. As for ratio of the mesopore volume/the micro-pore volume, $1.5 \leq Vm1/Vm2 \leq 15.0$ is more preferable, and $1.5 \leq Vm1/Vm2 \leq 10.0$ is still more preferable. When the mesopore volume Vm1 is the upper limit or less ($Vm1 \leq 0.250$), high charge-discharge efficiency to a lithium ion can be maintained, and when the mesopore volume Vm1 and the micro-pore volume Vm2 are the lower limit or more ($0.010 \leq Vm1$, $0.001 \leq Vm2$), high output characteristics are maintained.

In addition, to obtain a high output characteristics, the mesopore, which has higher ion conductivity than the micropore, is necessary. On the other hand, it is considered that it is necessary to control the micro-pore volume to obtain high durability, because, in the micro-pore having small pore size, desorption of impurities such as moisture, which are said to affect adversely on durability of the electrical storage element, is difficult. Therefore, control of ratio of the mesopore volume and the micro-pore volume is important, and in the case where it is the lower limit or more ($1.5 \leq Vm1/Vm2$), i.e., in the case where the carbon material deposits more on the micro-pore than on the mesopore of the activated carbon, and after the deposition, the mesopore volume of the composite porous material is more and the micro-pore volume is less, high energy density, high output characteristics and high durability (cycle characteristics, and float characteristics) are obtained. In the case where ratio of the mesopore volume and the micro-pore volume is the upper limit or less ($Vm1/Vm2 \leq 20.0$), high output characteristics is obtained.

In the present invention, a measuring method for the above-described mesopore volume Vm1 and the micro-pore volume Vm2 is similar to the measuring method in the above-described positive electrode active material.

In one aspect of the present invention, as described above, ratio of mesopore volume/micro-pore volume, after deposition of the carbon material on to the surface of the activated carbon, is important. In order to obtain the composite porous material having a pore distribution range specified by the present invention, pore distribution of the activated carbon to be used as a raw material is important.

In the activated carbon to be used in formation of the composite porous material as the negative electrode active material, it is preferable that $0.050 \leq Vm1 \leq 0.500$, $0.005 \leq Vm2 \leq 1000$ and $0.2 \leq Vm1/Vm2 \leq 20.0$, provided that mesopore volume derived from a pore having a diameter of 20 Å to 500 Å, calculated by the BJH method, is Vm1 (cc/g), and micro-pore volume derived from a pore having a diameter of smaller than 20 Å, calculated by the MP method, is Vm2 (cc/g).

As for the mesopore volume V1, $0.050 \leq Vm1 \leq 0.350$ is more preferable, and $0.100 \leq Vm1 \leq 0.300$ is still more preferable. As for the micro-pore volume V2, $0.005 \leq Vm2 \leq 0.850$ is more preferable, and $0.100 Vm2 \leq 0.800$ is still more preferable. As for ratio of the mesopore volume/the micro-pore volume, $0.22 \leq Vm1/Vm2 \leq 15.0$ is more preferable, and $0.25 \leq Vm1/Vm2 \leq 10.0$ is still more preferable. In the case where the mesopore volume Vm1 of the activated carbon is 0.500 or less, and in the case where the micro-pore volume Vm2 is 1.000 or less, control of a pore structure tends to be easy, since it is sufficient to deposit an suitable amount of the carbon material in order to obtain the pore structure of the composite porous material of one aspect of the above-described the present invention. On the other hand, in the case where the mesopore volume V1 of the activated carbon is 0.05 or more, and in the case where the micro-pore volume V2 thereof is 0.005 or more, as well as in the case where V1/V2 is 0.2 or more, and in the case where V1/V2 is 20.0 or less, the pore structure of the composite porous material of one aspect of the above-described the present invention can be easily formed, from pore distribution of the activated carbon.

Average particle size of the composite porous material in the present invention is preferably 1 μm to 10 μm. The lower limit thereof is more preferably 2 μm or more, and still more preferably 2.5 μm or more. The upper limit is more preferably 6 μm or less, and still more preferably 4 μm or less. When the average particle size is 1 μm to 10 μm, good durability is maintained. A measuring method for average particle size of the above-described composite porous material is the same as the measuring method used for average particle size of the activated carbon the above-described positive electrode active material.

Atomic ratio of a hydrogen atom/a carbon atom (hereafter it may also be referred to as H/C), in the above-described composite porous material, is preferably 0.05 to 0.35, and more preferably 0.05 to 0.15. The case where H/C is 0.35 or less is preferable, from the viewpoint of enhancing capacity (energy density) and charge-discharge efficiency, since a structure (specifically, a polycyclic aromatic conjugated structure) of the carbon material deposited at the surface of the activated carbon can be sufficiently grown. On the other hand, in the case where H/C is 0.05 or more, sufficient energy density is obtained, because carbonization never proceeds excessively. It should be noted that H/C is measured by an element analysis apparatus.

In addition, the above-described composite porous material usually has an amorphous structure derived from a raw material activated carbon, as well as a crystal structure derived from mainly a carbon material deposited. According to a wide-angle X-ray diffraction method, as the composite porous material, a material having a spacing $d_{002}$ of the (002) plane of 3.60 Å to 4.00 Å, and crystallite size Lc of 8.0 Å to 20.0 Å in a c-axis direction obtained from half peak width of this peak is preferable, and a material having the $d_{002}$ of 3.60 Å to 3.75 Å, and crystallite size Lc of 11.0 Å to 16.0 Å in a c-axis direction, obtained from half peak width of this peak is more preferable, since a structure having low crystallinity is preferable to exert high output characteristics, and a structure having high crystallinity is preferable to maintain reversibility of charge and discharge.

As a binding agent, for example, polyvinylidene fluoride (PVdF), polytetrafluoroethylene (PTFE), fluororubber, or a styrene-butadiene copolymer can be used. The mixing amount of the binding agent in the negative electrode active material layer is preferably 3 to 20% by weight, and still more preferably in a range of 5 to 15% by weight to the negative electrode active material.

Into the above-described negative electrode active material layer, a conductive filler composed of a carbonaceous material, having a higher electric conductivity compared with the negative electrode active material, can be mixed, as needed, other than the above-described carbon material, which is capable of intercalation of a lithium ion, and the binding agent. As the conductive filler, there is included acetylene black, Ketjen black, vapor grown carbon fiber, and a mixture thereof. Mixing amount of the conductive filler is preferably 0 to 20% by weight, and still more preferably in a range of 1 to 15% by weight, to the negative electrode active material. It is preferable that the conductive filler are mixed from the viewpoint of high input; however, when the mixing amount is more than 20% by weight or more, since the content of the negative electrode active material in the negative electrode active material layer decreases, energy density per volume decreases, and thus is not preferable.

The negative electrode body is obtained by preparing the paste, in which a carbon material capable of intercalation of a lithium ion, and a binding agent (and conductive filler as needed) are dispersed in a solvent, and coating this paste on the negative electrode current collector, drying and pressing as needed. As the coating method, a method similar to a method for preparing the positive electrode body can be used, and the coating method, in response to property of the paste and coating thickness, can be selected as appropriate. A thickness of the above-described negative electrode active material layer is usually about 50 to 200 µm.

Into the negative electrode active material used in the capacitor of the present invention, lithium can be doped in advance. By doping the lithium in advance, it is possible to control the initial efficiency, capacity, and output characteristics of the capacitor. The doping amount is in a range of 30 to 100%, and more preferably in a range of 40 to 80% of a lithium ion which the negative electrode active material can fully intercalate.

A method for doping the lithium ion into the negative electrode active material in advance is not especially limited in the present invention, and a known method can be used. For example, there is a method for forming the negative electrode active material into an electrode, and then using the negative electrode body as a working electrode, and metal lithium as a counter electrode, and preparing an electrochemical cell combined a non-aqueous electrolytic solution, and doping a lithium ion electrochemically. In addition, it is also possible to dope a lithium ion into the negative electrode active material, by crimping a metal lithium foil onto the negative electrode body and putting it into the non-aqueous electrolytic solution.

<Separator>

The separator to be used in the capacitor of the present invention has a role insulating the positive electrode body and the negative electrode body, so that they do not directly contact electrically, as well as forming a conducting path of the lithium ion between the electrodes by holding the electrolytic solution in voids of inside thereof. In the present embodiment, the separator is composed of a polyolefin resin including a polyethylene, and when the separator is maintained at 100° C. over 1 hour in an unconstrained state, thermal shrinkage of the separator is 3% to 10% in the first direction, and 2% to 10% in the second direction, which is orthogonal to the first direction. The thermal shrinkage of the separator is more preferably 4% to 9% in the first direction, and 3% to 9% in the second direction, and still more preferably, is 5% to 8% in the first direction, and 3.5% to 5% in the second direction.

It is a preferable embodiment that the first direction is the MD direction (forward direction when the separator formed as membrane in sheet form is wound-up onto a roll, and it is also referred to as "longitudinal direction"), and the second direction is the TD direction (direction perpendicular to the MD direction, and it is also be referred to as "width direction" or "short direction"), because production of the separator is easy (hereafter, there may be the case where the first direction is written as the MD, and the second as the TD). In the present description, "unconstrained state" means a state in which a subject is not fixed, and means that, for example, the separator in a sheet-state, is placed into an oven as it is. This thermal shrinkage is measured in accordance with the method described in the following Examples.

Further, a larger electrode area which is any one of an area of the positive electrode active material layer of the positive electrode body of the present invention and a negative electrode area of the negative electrode active material layer of the negative electrode body, and an area of the separator have a following relationship (separator area)>(electrode area); and $X^1$ and $X^2$ are both 0.5 to 8.0, wherein $X^1$ is calculated by the formula (1):

$$X^1 = \{L_1 \text{ or } L_1'/(A/2)\} \times 100$$

wherein, in an arbitrary straight line which is parallel to the first direction of the separator and makes any one of $L_1$ and $L_1'$ the shortest, in a top view, A is a length of a portion where the electrode area in the arbitrary straight line and the separator overlap, and $L_1$ and $L_1'$ are lengths of portions where the electrode area and the separator do not overlap; and wherein $X^2$ is calculated by the formula (2):

$$X^2 = \{L_2 \text{ or } L_2'/(B/2)\} \times 100$$

wherein, in an arbitrary straight line which is parallel to the second direction of the separator and makes any one of $L_2$ and $L_2'$ the shortest, in a top view, B is a length of a portion where the electrode area in the arbitrary straight line and the separator overlap, and $L_2$ and $L_2'$ are lengths of portions where the electrode area and the separator do not overlap.

An explanation will be given on A, L1, and L1' for determining $X^1$ with reference to FIG. 1. "1" indicates the separator; "2" indicates an electrode having larger area of any of area of the positive electrode active material layer of the positive electrode body or negative electrode area of the negative electrode active material layer of the negative electrode body; and "3" indicates a current collector (portion where the active material layer is not coated) in the electrode 2. As for $X^2$, the indications are same.

$X^1$ and $X^2$ are preferably 2.0 to 6.0, and still more preferably 3.0 to 5.0.

Figure 3:
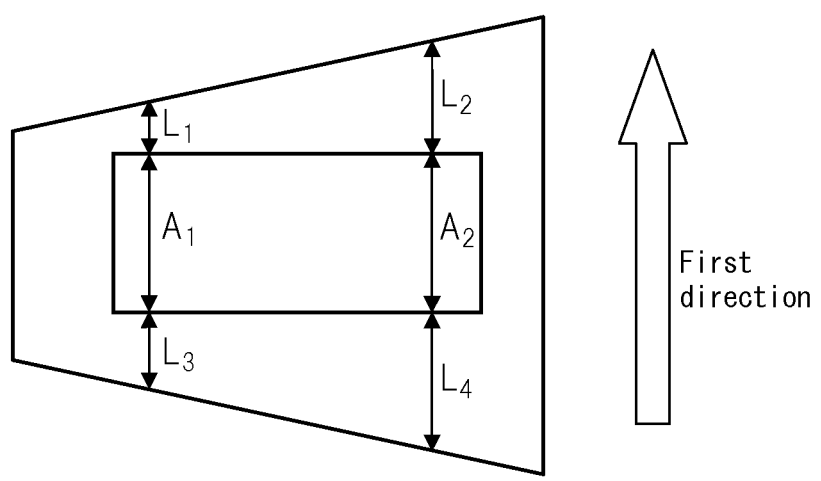
FIG. 3 is a schematic drawing for explaining the concept of margin.

Explanation will be given on meaning of the term "margin" in the present invention, with reference to FIG. 3.

(1) Points to be Noted

The margin is defined by a ratio of separator width ($L_1$, $L_2$, $L_3$, $L_4$) protruding from the electrode to an electrode width ($A_1$, $A_2$).

The margin portion ($L_1$) having the shortest width contracts to the inside of the electrode fastest by heating, resulting in short circuit. ($L_1 < L_3 < L_2 < L_4$). Accordingly, a method was adopted to specify the margin portion ($L_1$) having the shortest width, in response to various shapes.

(2) Specifying Method

Firstly, direction of the separator is specified. The separator has the MD direction and the TD direction derived from a production method, and as for a commercial product also, the directions can be specified from a thermal shrinkage state, by decomposition and heating it. Accordingly, it is specified by the MD direction and the TD direction. MD direction=the first direction, and the TD direction=the second direction.

Next, the margin was specified. The margin was specified by assuming an arbitrary line parallel to a direction specified above, specifying electrode width ($A_1$, $A_2$) and protruded width of the separator ($L_1$, $L_2$, $L_3$, $L_4$), and using the shortest protrusion width $L_1$ of the separator.

$$\text{Margin} = [L_1/(A_1/2)] \times 100(\%)$$

Using the electrode width ($A_1/2$) as standard, ratio of thermal shrinkage of "$A_1$ and $L_1$, $L_3$" and "$A_2$ and $L_2$, $L_4$" was standardized.

In a sealed-type electrical storage element using a laminate film outer casing, the outer casing is opened by vaporized pressure of the electrolytic solution, when exposed for a long period of time in an abnormally high temperature state largely over boiling point of the electrolytic solution. Such a separator can short-circuit the capacitor, before opening the outer casing by vaporized pressure of the electrolytic solution inside the capacitor by duration of an abnormally high temperature state, and is thus preferable, in order to prevent the capacitor from rupturing and igniting, and thereby enhancing safety. In this case, "rupturing" means a state in which the electrode laminate falls apart and mixes with the electrolytic solution and then escapes when the outer casing is opened.

In the case of a lithium ion battery, a separator is necessary to shut down at abnormally high temperature; however, it is necessary to avoid a short circuit of the positive electrode body and the negative electrode body caused by melt down at a much higher temperature, as much as possible. Accordingly, the separator having low thermal shrinkage and difficult to melt down has been used. On the other hand, in the case of a lithium ion capacitor, since a separator is not necessary to make it shut down at an abnormally high temperature, a paper separator, which never shuts down and melts even at an even higher temperature, has been used. However, it has been found that even in a lithium ion capacitor, there is risk of rupturing/igniting, when higher capacity and higher output are promoted, and in order to prevent it, such function effectively provides nearly simultaneous melt down, in shut down at an abnormally high temperature. I.e., it has been found that the separator having thermal shrinkage as described above and composing of a polyolefin resin including a polyethylene is preferable, because it is capable of melting down in a short period of time at an abnormally high temperature, and thus short circuit of the capacitor can occur safely without rupturing or igniting, and thereby safety can be enhanced, in opening of the outer casing due to an abnormally high temperature state.

As described-above, when the thermal shrinkage of the separator of the present invention is 3% or more in the first direction, and 2% or more in the second direction, melt down can be obtained in a short period of time at an abnormally high temperature, and short circuit of the capacitor can be obtained safely without rupturing or igniting, and thereby safety can be enhanced; as well as when thermal shrinkage is 10% or less in the first direction, and 10% or less in the second direction, capacitor function can be maintained, without short circuit in a normal temperature range.

In addition, when $X^1$ and $X^2$ are 0.5 or more, capacitor function can be maintained without short circuit in a normal use temperature range, and when they are 8.0 or less, melt down can be obtained in a short period of time at an abnormally high temperature, and short circuit of the capacitor can be obtained safely without rupturing or igniting, and thereby safety can be enhanced.

In the present embodiment, it is preferable that the separator is the microporous membrane, and piercing strength (absolute strength) of the microporous membrane is preferably 200 g or more, and more preferably 300 g or more. It is preferable to make the piercing strength 200 g or more, so that generation of a pinhole or a crack can be decreased in the case of using the microporous membrane as the separator for a capacitor, even in the case where a sharp part of the electrode material, etc., provided in the capacitor pierces into the microporous membrane. The upper limit of the piercing strength is not limited; however, it is preferably 1000 g or less. It should be noted that the piercing strength is measured in accordance with the method described in the following Examples.

Porosity of the microporous membrane of the present embodiment is preferably 30% to 70%, and more preferably 55% to 70%. It is preferable to set the porosity at 30% or more, in order to rapidly transfer a lithium ion at a high rate, in the case where the microporous membrane is used as the separator of the capacitor. On the other hand, it is preferable to set the porosity at 70% or less, in order to enhance membrane strength, and also in view of self-discharge inhibition, in the case where the microporous membrane is used as the separator of the capacitor. The porosity is measured in accordance with the method described in the following Examples.

In addition, AC resistance of the microporous membrane of the present embodiment is preferably 0.9 cm$^2$ or less, more preferably 0.6 Ωcm$^2$ or less, and still more preferably 0.3 Ωcm$^2$ or less, from the viewpoint of output in the case of using as the separator of the capacitor.

The AC resistance of the microporous membrane is measured in accordance with the method described in the following Examples.

It should be noted that a means for forming the microporous membrane provided with various characteristics as described above, includes, for example, a method for optimizing the polyolefin concentration in extrusion, formulation ratio of various polyolefins including polyethylene and polypropylene in polyolefin, molecular weight of the polyolefin, draw ratio, as well as drawing operation and relaxation operation after extraction.

In addition, thermal shrinkage in the MD direction and in the TD direction of the separator can be adjusted by optimizing the drawing temperature and draw ratio in heat setting.

In addition, an aspect of the microporous membrane may be an aspect of a single layer body or an aspect of a laminate of multi-layer bodies.

Next, an explanation will be given of a production method of the microporous membrane of the present embodiment. However, the production method of the present embodiment is not limited, with respect to the polymer type, type of solvent, an extrusion method, a drawing method, an extraction method, a pore opening method, or a heat setting/heat treatment method, as long as the obtained microporous membrane is the above-described microporous membrane.

It is preferable that the production method for the microporous membrane of the present embodiment includes a melt kneading and forming step of polymer and plasticizer, or polymer, plasticizer and filler; a drawing step; and an extraction step of plasticizer (and filler as needed); and a heat setting step, from the viewpoint of suitably controlling the property balance of permeability and membrane strength.

More specifically, for example, the production method for the microporous membrane including each step of the following steps (1) to (4) can be used:

(1) A kneading step for kneading a polyolefin, a plasticizer, and filler as needed, to form a kneaded product;
(2) A sheet forming step by extruding the kneaded product after the kneading step, forming it to sheet-shape of a single layer or sheet-shape laminated with multiple layers to make it cool and solidify;

(3) A drawing step for extracting the plasticizer and/or filler as needed, and further drawing the sheet (sheet shaped molded body) in one-axis or more direction, after sheet forming step;
(4) A post-processing step for extruding the plasticizer and/or filler as needed, and further carrying out heat treatment, after the drawing step;

The polyolefin to be used in kneading step of the above-described (1) contains polyethylene as an essential component. The polyolefin may be the one composed of one kind of polyethylene, or a polyolefin composition including multiple kinds of polyolefins.

As the polyolefin, there is included, for example, polyethylene, polypropylene, and poly-4-methyl-1-pentene, and a mixture blended with two or more kinds thereof may be used. Hereinafter, polyethylene may be abbreviated as "PE", and polypropylene may be abbreviated as "PP".

Viscosity average molecular weight (Mv) of the polyolefin is preferably 50,000 to 3,000,000, and more preferably 150,000 to 2,000,000. When the viscosity average molecular weight is 50,000 or more, high strength microporous membrane tends to be obtained, and it is thus preferable, as well as when the viscosity average molecular weight is 3,000,000 or less, effect of making the extrusion step easy tends to be obtained, and it is thus preferable. The viscosity average molecular weight is measured in accordance with the method described in the following Examples.

In addition, melting point of the polyolefin is preferably 100 to 165° C., and more preferably 110 to 140° C.

The melting point of 100° C. or more is preferable, because function under high temperature environment tends to be stabilized, and the melting point of 165° C. or less is preferable, because generation of melt down at high temperature or fuse effect tends to be obtained. It should be noted that the melting point means temperature of a melting peak in differential scanning calolimetry (DSC). In addition, the melting point of the polyolefin in the case where polyolefins are used as multiple kinds of mixture, means temperature of a peak having the largest melting peak area, in the DSC of the mixture thereof.

As the polyolefin, use of high density polyethylene is preferable, from the viewpoint that heat setting can be carried out at higher temperature, while suppressing clogging of a pore.

Ratio of such a high density polyethylene occupying in the polyolefin is preferably 5% by weight or more, and more preferably 10% by weight or more. When the ratio is 5% by weight or more, heat setting can be carried out at higher temperature while further suppressing clogging of a pore. On the other hand, the ratio of such a high density polyethylene occupying in the polyolefin is preferably 99% by weight or less, and more preferably 95% by weight or less. When the ratio is 50% by weight or less, the microporous membrane can have not only effect by the high density polyethylene but also effect by other polyolefin, in good balance.

In addition, as for the polyolefin, it is preferable to use polyethylene having viscosity average molecular weight (Mv) of 100,000 to 300,000, from the viewpoint of enhancing shut down characteristics or enhancing safety in a nail penetration test, in the case of using the microporous membrane as the separator of the capacitor.

Ratio of such a polyethylene, having viscosity average molecular weight (Mv) of 100,000 to 300,000, occupying in the polyolefin, is preferably 30% by weight or more, and more preferably 45% by weight or more. When the ratio is 30% by weight or more, shut down characteristics can be still more enhanced, or safety in a nail penetration test can be enhanced, in the case of using the microporous membrane as the separator of the capacitor. On the other hand, the ratio of polyethylene having viscosity average molecular weight (Mv) of 100,000 to 300,000, occupying in the polyolefin, is preferably 100% by weight or less, and more preferably 95% by weight or less.

As the polyolefin, polypropylene may be added, from the viewpoint of controlling melt down temperature.

Ratio of such a polypropylene occupying in the polyolefin is preferably 5% by weight or more, and more preferably 8% by weight or more. The ratio of 5% by weight or more is preferable from the viewpoint of enhancing membrane rupturing resistance at high temperature. On the other hand, the ratio of polypropylene occupying in the polyolefin is preferably 20% by weight or less, and more preferably 18% by weight or less. The ratio of 20% by weight or less is preferable, from the viewpoint of realizing the microporous membrane having not only effect by polypropylene but also effect by other polyolefin in good balance.

As the plasticizer to be used in the kneading step of (1), it may be the one conventionally used in the microporous membrane made of a polyolefin, and includes, for example, a phthalate ester such as dioctyl phthalate (hereinafter, it may be abbreviated as "DOP"), diheptyl phthalate, or dibutyl phthalate; an organic acid ester other than the phthalate ester such as an adipate ester and a glycerate ester; a phosphate ester such as a trioctyl phosphate; liquid paraffin; solid wax; and mineral oil. These may be used alone, or in combination of two or more kinds. Among these, in consideration of compatibility with polyethylene, the phthalate ester is particularly preferable.

In addition, in the kneading step of (1), a kneaded product may be formed by kneading the polyolefin and the plasticizer, or the kneaded product may be formed by kneading the polyolefin, the plasticizer and the filler. As the filler to be used in the latter case, at least one of an organic fine particle and an inorganic fine particle can also be used.

As the organic fine particle, for example, a modified polystyrene fine particle and a modified acrylic acid resin particle are included.

As the inorganic fine particle, there is included, for example, oxide type ceramics such as alumina, silica (silicon oxide), titania, zirconia, magnesia, ceria, yttria, a zinc oxide, and an iron oxide; nitride type ceramics such as a silicon nitride, a titanium nitride, and a boron nitride; ceramics such as a silicon carbide, a calcium carbonate, an aluminum sulfate, an aluminum hydroxide, a potassium titanate, talc, kaolin-clay, kaolinite, halloysite, pyrophyllite, montmorillonite, sericite, mica, amesite, bentonite, asbestos, zeolite, a calcium silicate, a magnesium silicate, diatomaceous earth, or silica sand; and a glass fiber.

Blend ratio of the polyolefin and the plasticizer and the filler to be used as needed, in the kneading step of (1), is not especially limited. The ratio of polyolefin occupying in the kneaded product is preferably 25 to 50% by weight, from the viewpoint of strength of the obtained microporous membrane and membrane forming property. In addition, the ratio of the plasticizer occupying in the kneaded product is preferably 30 to 60% by weight, from the viewpoint of obtaining the viscosity suitable for extrusion. The ratio of the filler occupying in the kneaded product is preferably 10% by weight or more, from the viewpoint of enhancing uniformity of pore size of the obtained microporous membrane, and is preferably 40% by weight or less, from the viewpoint of membrane forming property.

It should be noted that, in the kneaded material, there may be mixed various additives as needed still more, an antioxidant such as a phenol-based one such as pentaerythrityl-tetrakis-[3-(3,5-di-t-butyl-4-hydroxyphenyl) propionate], a phosphorus-based one, and a sulfur-based one; metallic soaps such as calcium stearate, and zinc stearate; an ultraviolet absorber; a light stabilizer; an antistatic agent; an antifogging agent; and a coloring pigment.

A kneading method in the kneading step of (1) is not especially limited, and it may be a conventionally used method. For example, as the order of kneading, a portion of the polyolefin, the plasticizer and the filler to be used as needed may be mixed in advance, using a general mixing machine such as a Henschel mixer, a V-blender, a ProShare mixer, or a ribbon blender, and then the mixture may be kneaded further together with the remaining raw materials; or all raw materials may be kneaded at the same time.

In addition, equipment to be used in kneading is not especially limited, and kneading can be carried out using, for example, melt kneading apparatus such as an extruder, or a kneader.

The sheet forming step of (2) is a step, for example, for extruding the above-described kneaded product to sheet form via a T-die etc., and then cooling and solidifying the extruded substance by making it contacted with a thermal conductor. As the relevant thermal conductor, a metal, water, air and the plasticizer itself can be used. In addition, it is preferable to carry out cooling and solidifying by sandwiching the extruded substance between a pair of rolls, from the viewpoint of increasing membrane strength of the obtained sheet shaped molded body, and from the viewpoint of enhancing surface smoothness of the sheet shaped molded body.

The drawing step of (3) is a step for obtaining a stretched sheet by drawing a sheet (sheet shaped molded body) obtained via the sheet forming step. A drawing method in the drawing step includes MD uniaxial drawing by a roll drawing machine; TD uniaxial drawing by a tenter; sequential biaxial drawing by a combination of the roll drawing machine and the tenter, or by a combination of the tenter and the tenter; and simultaneous biaxial drawing by a simultaneous biaxial tenter or an inflation molding. As for the drawing method of the sheet, from the viewpoint of obtaining a more uniform membrane, simultaneous biaxial drawing is preferable. Total surface area magnification in drawing is preferably eight times or more, more preferably fifteen times or more, and still more preferably thirty times or more, from the viewpoint of uniformity of membrane thickness, and balance of tensile strength, porosity and average pore size. When the total surface area magnification is 30 times or more, a high strength microporous membrane tends to be obtained easily. Drawing temperature is preferably 121° C. or more, from the viewpoint of providing high permeability and low contractibility at high temperature, and preferably 135° C. or less, from the viewpoint of membrane strength.

Extraction prior to drawing in the drawing step of (3), or heat treatment in the post-processing step of (4), is carried out by a method for immersing the sheet or the stretched sheet into an extraction solvent, or for showering the extraction solvent onto the sheet or the stretched sheet. It is preferable that the extraction solvent is a poor solvent for a polyolefin, and a good solvent for a plasticizer and filler, and the boiling point is lower than the melting point of the polyolefin. These extraction solvents include, for example, hydrocarbons such as n-hexane and cyclohexane; halogenated hydrocarbon such as methylene chloride, 1,1,1-trichloroethane and fluorocarbon; alcohol such as ethanol and isopropanol; ketones such as acetone and 2-butanone; and alkaline water. The extraction solvents may be used alone or may be used in combination of two or more kinds.

It should be noted that the filler may be extracted as a whole or a part thereof in any of the step in the whole steps, or may be remained in the microporous membrane obtained finally. In addition, the order, the method and the number of times of the extraction are not especially limited.

A heat treatment method in the post-processing step of (4) includes a heat setting method for carrying out drawing and/or relaxation operation at predetermined temperature to the stretched sheet obtained via the drawing step, using a tenter and/or a roll drawing machine. The relaxation operation is a reduction operation which is carried out by predetermined relaxation rate in the MD and/or the TD of the membrane. The relaxation rate is a value of the MD dimension of the membrane after the relaxation operation divided by the MD dimension of the membrane before the relaxation operation; or a value of the TD dimension of the membrane after the relaxation operation divided by the TD dimension of the membrane before the operation; or a multiplied value of the relaxation rate of the MD and the relaxation rate of the TD, in the case relaxed in both the MD and the TD. The above-described predetermined temperature is preferably 130° C. or less, and more preferably 123° C. or less, from the viewpoint of control of thermal shrinkage or control of membrane resistance. On the other hand, the above-described predetermined temperature is preferably 115° C. or more, from the viewpoint of drawing property. In addition, it is preferable to draw the stretched sheet by 1.5 times or more toward the TD, and more preferably by 1.8 times or more toward the TD, at the post processing step, from the viewpoint of thermal shrinkage and permeability. On the other hand, it is preferable to draw the stretched sheet by 6.0 times or less toward the TD, from the viewpoint of safety, and more preferably by 4.0 times or less, from the viewpoint of balance of membrane strength and permeability. The predetermined relaxation rate is preferably 0.9 times or less, from the viewpoint of inhibition of thermal shrinkage, and more preferably 0.6 times or less, from the viewpoint of prevention of wrinkle generation, porosity and permeability. The relaxation operation may be carried out in both directions of the MD and the TD, or may be the relaxation operation in only one direction of either of the MD and the TD. Even the relaxation operation in only one direction of either of the MD and the TD, it is possible to reduce the thermal shrinkage not only in the operation direction but also in the other direction.

Viscosity average molecular weight of the obtained microporous membrane is preferably 200,000 to 1,000,000. When the viscosity average molecular weight thereof is 200,000 or more, membrane strength is easily maintained, and when the viscosity average molecular weight is 1,000,000 or less, superior formability is provided.

In addition, membrane thickness of the microporous membrane is preferably 5 μm or thicker, from the viewpoint of safety, and preferably 35 μm or less and more preferably 25 μm or less, from the viewpoint of high output/high capacity density. This membrane thickness is measured in accordance with the method described in the following Examples.

In addition, it is preferable that pore size of the microporous membrane is 0.01 μm to 0.1 μm, and a number of pores is 100 to 250 pores/μm$^2$. When the pore size is 0.01 μm or more, it is a size where an ion can diffuse sufficiently, and when the pore size is 0.1 μm or less, roughness of the membrane surface can be decreased, and thus short circuit caused by biting of an electrode can be prevented. When the number of pores is 100 pores/m² or more, the microporous membrane can have the void sufficient for an ion to diffuse, or when the number of pores is 250 pores/m² or less, membrane strength can be maintained. This pore size and number of pores are measured in accordance with the method described in the following Examples.

In addition, it is preferable that a Brugmann index be measured and calculated, using methyl ethyl carbonate of the separator as a probe molecule, is 2.0 to 3.0. The Brugmann index means a value for expressing the quality of a membrane pore structure not depending on porosity, which is calculated by $\varepsilon \times D = \varepsilon^\alpha \times D_0$ ($\varepsilon$ represents membrane porosity, $D_0$ represents diffusion coefficient in free space, and a represents the Brugmann index), using methyl ethyl carbonate as a probe molecule, and using the diffusion coefficients (D) obtained by Pulsed Field Gradient Nuclear Magnetic Resonance method (PFG-NMR method). Accordingly, the one having the smaller Brugmann index provides a pore structure having the more superior ion diffusion. When the present index is 2.0 or more, membrane strength can be maintained, and when the index is 3.0 or less, the microporous membrane can have a pore structure sufficiently suitable for an ion to diffuse. This index is measured in accordance with the method described in the following Examples.

It should be noted that the production method for the microporous membrane can have a step for laminating multiple pieces of the single layer body, as a step for obtaining the laminate, in addition to each step of the above-described (1) to (4). In addition, the production method thereof may have a step for applying the surface treatment such as electron beam irradiation, plasma irradiation, surfactant coating and chemical modification, onto the microporous membrane.

<Capacitor>

The capacitor of the present invention can be prepared by a method for preparing an electrode laminate, where the positive electrode body and the negative electrode body are laminated via the separator, attaching the outer casing such as a laminate film onto the electrode laminate, drying by heating it using a dryer set at temperature of heat resistant temperature of the separator or less, and injecting the electrolytic solution. Alternatively, there may be adopted such a method for drying by heating the above-described electrode laminate in advance, and then attaching the outer casing and injecting the electrolytic solution; or a method for drying by heating each electrode body and the separator individually, before laminating, and then preparing the electrode laminate, attaching the outer casing, and injecting the electrolytic solution. It is more preferable to dry by heating under reduced pressure condition, in drying by heating, because drying time can be shortened.

For example, in the case where the separator composed of the above-explained polyolefin resin is used for the capacitor of the present invention, it is sufficient to be dried by heating at 80° C. By setting at such temperature condition, a pore opened in the separator can be dried without clogging, by heating the electrode laminate before injecting the electrolytic solution, and reliability can be enhanced while maintaining output characteristics of the capacitor. Detailed reason why reliability of the capacitor is enhanced by drying by heating the electrode laminate before injecting the solution is not clear, however, it is considered that it is because water content contained in the positive electrode or the negative electrode can be reduced.

The lithium ion capacitor of the present invention has a short circuit starting temperature from 120° C. to 150° C. and a dead-short-circuit temperature from 120° C. to 150° C., and difference between the short circuit starting temperature and the dead-short-circuit temperature is 20° C. or less, when the lithium ion capacitor is heated in an environment in which a temperature is increased from 30° C. or less at a rate of 5° C./min. Therefore, it is preferable from the viewpoint of preventing rupturing and igniting of the capacitor and enhancing safety, because the capacitor can be made short circuit, before the outer casing is opened by vaporized pressure of the electrolytic solution inside the capacitor, even when such an abnormally high temperature state is continued. In this case, "rupturing" means a state in which the electrode laminate falls apart and mixes with the electrolytic solution and escapes when the outer casing is opened. Difference between the short circuit starting temperature and the dead-short-circuit temperature is preferably 15° C. or less, and still more preferably 10° C. or less.

The short circuit starting temperature and the dead-short-circuit temperature are surface temperatures of the capacitor, and can be measured using, for example, a thermocouple pasted by a heat resistant tape at the center part of the main surface of the capacitor. The short circuit starting temperature means temperature of an initiation point, where a voltage curve abruptly decreases under the above-described heating condition, and point A corresponds to that in Example 1-2 of FIG. 2. In addition, the dead-short-circuit temperature means temperature of a point, where a voltage curve firstly drops to 0 under the above-described heating condition, and point B corresponds to that in Example 1-2 of FIG. 2

It should be noted that the capacitor of the present invention is possible to prepare also by using an electrode body in which the positive electrode body and the negative electrode body are wound via the separator. In this case, the positive electrode and the negative electrode body to be wound and the separator take a belt-like shape, and only any one of $X^1$ and $X^2$ corresponding to a shorter direction of this belt-like substance can be specified, and any one of them may be 0.5 to 0.8.

In addition, it is preferable that the capacitor of the present invention has a capacitance of 1000 F to 5000 F. When the capacitance is 1000 F or more, effect of enabling safely and simultaneously make short circuit in which the capacitor of the present invention has, is more effective, because electric amount stored by the capacitor is high. In addition, when the capacitance is 5000 F or less, a cell can be prepared efficiently.

The non-aqueous electrolytic solution to be used in the capacitor of the present invention may be a non-aqueous fluid comprising a lithium ion-containing electrolyte. The non-aqueous fluid may contain a solvent, and as the solvent, there can be used, for example, a cyclic carbonate ester represented by ethylene carbonate (EC) and propylene carbonate (PC); a chained carbonate ester represented by diethyl carbonate (DEC), dimethyl carbonate (DMC), and methyl ethyl carbonate (MEC); lactones such as γ-butyrolactone (γBL), and mixed solvents thereof.

As the salt soluble in the solvents, a lithium salt, such as $LiBF_4$, $LiPF_6$ can be used. It is preferable that salt concentration of the electrolytic solution is in a range of 0.5 to 2.0 mol/L. When the concentration is 0.5 mol/L or more, an anion is present sufficiently, and capacity of the capacitor is maintained. On the other hand, when the concentration is 2.0 mol/L or less, the salt is dissolved sufficiently in the electrolytic solution, and suitable viscosity and electric conductivity of the electrolytic solution are maintained.

In the electrode laminate, one end of the positive electrode terminal is electrically connected to the positive electrode body, and one end of the negative electrode terminal is electrically connected to the negative electrode body. Specifically, the positive electrode terminal is electrically connected to the non-coated region of the positive electrode active material layer of the positive electrode current collector, and the negative electrode terminal is electrically connected to the non-coated region of the negative electrode active material layer of the negative electrode current collector. It is preferable that the positive electrode terminal material is aluminum, and the negative electrode terminal material is a nickel plated copper.

The electrode terminal generally has a nearly rectangular shape, and one end thereof is electrically connected to the current collector of the electrode laminate, and the other end is electrically connected to outer load (in the case of discharging) or a power source (in the case of charging), during use. It is a preferable aspect that, to the center part of the electrode terminal, which is a sealed part of the laminate film outer casing, a film made of a resin, such as polypropylene, is attached, in order to prevent short circuit of the electrode terminal and the metal foil constituting the laminate film, and also enhance sealing tightness.

As the electrical connection method of the above-described electrode laminate and electrode terminal, for example, an ultrasonic welding method is usual, however, resistance welding, laser welding, etc., may be accepted and not especially limited.

It is also preferable that the laminate film to be used in the outer casing is a film where a metal foil and a resin film are laminated, and a three-layer constitution consisting of an outer layer resin film/metal foil/inner layer resin film is exemplified. The outer layer resin film is used to prevent the metal foil from receiving damage caused by contact, etc., and a resin, such as nylon or polyester can be preferably used to prepare the film. The metal foil is used to prevent permeation of moisture or gas, and copper foil, aluminum foil, stainless steel foil, etc., can be preferably used to prepare the metal foil. The inner layer resin film is used to protect the metal foil from the electrolytic solution stored inside, as well as to carry out melt sealing during heat sealing, and for example, a polyolefin, an acid modified polyolefin, etc., can be preferably used to prepare the film.

EXAMPLE

Explanation will be given below specifically on embodiments of the present invention with reference to Examples and Comparative Examples, however, the present invention should not be limited thereto. It should be noted that various properties of the microporous membrane for the separator were measured by the following methods:

(1) Viscosity Average Molecular Weight (Mv)

In order to prevent deterioration of a sample, 2,6-di-t-butyl-4-methylphenol was dissolved in decahydronaphthalene so as to attain a concentration of 0.1% by weight, and the obtained product (hereinafter, abbreviated as "DHN") was used as a solvent for the sample. A sample solution was obtained by dissolving the sample in DHN at 150° C., so as to attain a concentration of 0.1% by weight. 10 mL of the sample solution was sampled to measure number of seconds (t) required to pass through between marked lines at 135° C., using the Cannon-Fenske viscometer (SO100). In addition, after heating DHN at 150° C., 10 mL thereof was sampled to measure number of seconds ($t_B$) required to pass through between marked lines of the viscometer by a similar method. Limiting viscosity [η] was calculated by the following conversion formula, using the obtained pass through numbers of second t, $t_B$.

$$[\eta]=((1.651t/t_B-0.651)^{0.5}-1)/0.0834$$

Viscosity average molecular weight (Mv) was calculated from [η] determined. My of the raw material polyethylene, the raw material polyolefin composition and the microporous membrane was calculated by the following formula.

$$[\eta]=6.77\times10^{-4}Mv^{0.67}$$

In addition, Mv of the raw material polypropylene was calculated by the following formula.

$$[\eta]=1.10\times10^{-4}Mv^{0.80}$$

(2) Membrane Thickness (μm)

Membrane thickness was measured at an ambient temperature of 23±2° C., using KBM (trade name), which is a minute thickness gauge, manufactured by Toyo Seiki Kogyo, Co., Ltd.

(3) Porosity (%)

A sample with a square size of 10 cm×10 cm was cut out from the microporous membrane to determine volume (cm$^3$) and weight (g) thereof, and the porosity was calculated from them and membrane density (g/cm$^3$), using the following formula.

Porosity=[(volume−weight/membrane density)/volume]×100

It should be noted that membrane density was calculated from fraction of composition, provided that membrane density of polyethylene is 0.95, and membrane density of polypropylene is 0.91. It should be noted that as various membrane densities, density determined by a density gradient tube method of JISK-7112 can also be used.

(4) Thermal Shrinkage (%)

In the case of the separator before being incorporated into the capacitor, a sample specimen was cut out in a size of 100×50 mm, with matching to directions measuring each of the MD and the TD. After the sample specimen was held in an oven at 100° C. for 1 hour in an unconstrained state, each length of the MD and the TD was measured at room temperature.

Thermal shrinkage is given by:

((length before heating)−(length after heating))×100/length before heating

In the case of the separator incorporated into the capacitor, the separator was taken out by disassembling the capacitor, to be subjected to immersion cleaning, with using the electrolytic solution solvent (for example, methyl ethyl carbonte (MEC), etc.), and followed by natural drying. Hereafter, by carrying out the test similarly as described above, thermal shrinkage was determined.

If the TD and MD directions of the separator cannot be specified, thermal shrinkage of the present invention is specified by determining a direction having the largest thermal shrinkage by the above-described natural drying, as the MD direction, and a direction vertical thereto as the TD direction.

It should be noted that also in the case where the taken out separator is one piece with a band-shape (in this case, the electrode also is a band-shape, and the electrode body is a wound-state), or a zigzag folding shape (in this case, the electrode is a sheet, and the electrode body is a laminated-state), the directions are specified by a similar method to specify thermal shrinkage. Specifically, after understanding positional relationship with the margin, a part of the separator is cut-out, and a direction showing the largest thermal shrinkage by natural drying was determined as the MD direction, and a direction vertical thereto was determined as the TD direction, and thus thermal shrinkage in the MD and TD directions of the band-shape or the zigzag folding shape separator was determined. However, only in the case where length of the MD direction in the band-shape is longer by 4 times or more than length of the TD direction, the MD direction is not specified, and only TD direction is specified (only $X^2$ is specified).

In addition, in the case where the taken-out separator is a sheet and a laminate of multiple electrodes, the sheet itself, or a part thereof, in understanding positional relationship with the margin, is cut-out, and the MD direction and the TD direction of each separator were specified, and thermal shrinkage was determined, as described above.

(5) Pore Size (μm) and Number of Pores (Pores/μm$^2$) of the Microporous Membrane It has been known that the fluid inside of the capillary follows Knudsen flow, when mean free path of fluid is larger than pore size of the capillary, and it follows Poiseuille flow, when it is smaller.

Accordingly, it is assumed that air flow in air permeability measurement of the microporous membrane follows Knudsen flow, and water flow in water permeability measurement of the porous membrane follows Poiseuille flow.

In this case, pore size d (μm) and tortuosity ratio $\tau_a$ (dimensionless) of the porous membrane can be determined, using the following formulas, from permeation rate constant of air $R_{gas}$ (m$^3$/(m$^2$·sec·Pa)), permeation rate constant of water $R_{liq}$ (m$^3$/(m$^2$·sec·Pa)), molecular speed of air ν (m/sec), viscosity of water η (Pa·sec), standard pressure P, (=101325 Pa), porosity ε (%), membrane thickness L (μm).

$$d=2\nu \times (R_{liq}/R_{gas})\times (16\eta/3P_s)\times 10^\varepsilon$$

$$\tau_a=(d\times(\varepsilon/100)\times\nu/(3L\times P_s\times R_{gas}))^{1/2}$$

Here, $R_{gas}$ is determined from air permeability (sec), using the following formula.

$$R_{gas}=0.0001/(\text{air permeability}\times(6.424\times10^{-4})\times(0.01276\times101325))$$

In addition, $R_{liq}$ is determined from water permeability (cm$^3$/(cm$^2$·sec·Pa)), using the following formula.

$$R_{liq}=\text{water permeability}/100$$

It should be noted that water permeability is determined as follows. A porous membrane, which has been immersed in alcohol in advance, was set in a liquid permeation cell made of stainless steel having a diameter of 41 mm, and after cleaning the alcohol of the membrane with water, water was permeated through by a pressure difference of about 50000 Pa, and water permeation amount per unit time "unit pressure" unit area was calculated from water permeation amount (cm$^3$) passed through during 120 seconds, and this value was used as water permeability.

In addition, ν can be determined from gas constant R (=8.314), absolute temperature T (K), circular constant π, and average molecular weight of air M (=2.896×10$^{-2}$ kg/mol), using the following formula.

$$\nu=((8R\times T)/(\pi\times M))^{1/2}$$

Still more, a number of pores B (pores/μm$^2$) is determined by the following formula.

$$B=4\times(\varepsilon/100)/(\pi\times d^2\times \tau_a)$$

(6) Brugmann Index of the Microporous Membrane

Using ECA400 manufactured by JEOL Ltd., the diffusion coefficient (D), which was obtained by the Pulsed Field Gradient Nuclear Magnetic Resonance method (PFG-NMR method) using methyl ethyl carbonte as a probe molecule, was calculated. Calculation was carried out in the region where ln(E/E) is −2 or more, from linear relationship obtained from ln(E/E$_0$)=−D×(γ$^2$δ$^2$g$^2$(Δ−δ/3)) (wherein, E: peak intensity at each measurement point, E$_0$: peak intensity when PFG is not given, γ: gyromagnetic ratio of a nuclear spin, δ: PFG irradiation time, g: PFG intensity, Δ: diffusion time). Next, Brugmann index was calculated from $$\varepsilon\times D=\varepsilon^\alpha\times D_0$$

(wherein, ε represents porosity of the membrane, D$_0$ represents diffusion coefficient in free space, and α represents Brugmann index).

Example 1-1

Preparation of Positive Electrode Body

Crushed carbonized coconut shell was subjected to carbonization in a compact carbonization furnace in nitrogen at 500° C. for 3 hours. The carbonized product was put in an activation furnace, steam in a heated state in a preheating furnace was charged into the activation furnace, in a rate of 1 kg/h, the carbonized product was taken out after increasing temperature up to 900° C. taking 8 hours, and cooled under nitrogen atmosphere, to obtain an activated carbon. The obtained activated carbon was cleaned with flowing water for 10 hours, and then drained. After that, it was dried in an electric drying machine maintained at 115° C., for 10 hours, and then pulverized using a ball mill for 1 hour to obtain an activated carbon 1. Measurement result of average particle size using a laser diffraction particle size distribution analyzer (SALD-2000J), manufactured by Shimadzu Corp., was 4.2 μm. In addition, pore distribution was measured using a pore distribution measuring device (AUTOSORB-1 AS-1-MP), manufactured by Yuasa Ionics Co., Ltd. As the result, BET specific surface area was 2360 m$^2$/g, mesopore amount (V1) was 0.52 cc/g, and micro-pore amount (V2) was 0.88 cc/g.

Slurry was obtained by mixing 80.8 parts by weight of the activated carbon 1, 6.2 parts by weight of Ketjen black, 10 parts by weight of PVDF (polyfluorovinilidene), and 3.0 parts by weight of PVP (polyvinylpyrrolidone), as well as NMP (N-methylpyrrolidone). Next, the obtained slurry was applied onto single-side of an aluminum foil having a thickness of 15 μm, dried and pressed to obtain the single-side positive electrode body having a thickness of the active material layer of 55 μm. Similarly, the slurry was applied onto both sides of the aluminum foil, dried and pressed to obtain the both side positive electrode body.

[Preparation of Negative Electrode Body]

Pore distribution of a commercial coconut shell activated carbon was measured using nitrogen as an adsorbate, and using a pore distribution measuring device (AUTOSORB-1 AS-1-MP), manufactured by Yuasa Ionics Co., Ltd. Specific surface area was determined by BET one point method. In addition, as described above, using an isotherm at the desorption side, the mesopore amount and the micro-pore amount were determined by the BJH method and the MP method, respectively. As the result, BET specific surface area was 1,780 m$^2$/g, mesopore amount was 0.198 cc/g, micro-pore amount was 0.695 cc/g, V1/V2=0.29, and average pore size was 21.2 Å.

The coconut shell activated carbon of 150 g was put in a cage made of a stainless steel mesh, and the cage was put on a stainless steel bat including 270 g of coal-based pitch (softening point: 50° C.), and the cage and bat were then placed in an electric furnace (effective dimension inside the furnace: 300 mm×300 mm×300 mm), to carry out a thermal reaction. Heat treatment was carried out under nitrogen atmosphere, and by raising temperature up to 600° C. taking 8 hours, and by maintaining at the same temperature for 4 hours; the sample was subsequently cooled down to 60° C. by natural cooling and then it was taken out of the furnace to obtain a composite porous material 1 as a negative electrode material. With respect to the obtained composite porous material 1, measurement was carried out similarly as in the above-described activated carbon 1, and BET specific surface area was 262 m$^2$/g, mesopore amount (Vm1) was 0.1798 cc/g, micro-pore amount (Vm2) was 0.0843 cc/g, and Vm1/Vm2=2.13.

Slurry was obtained by mixing 83.4 parts by weight of the above-described composite porous material 1, 8.3 parts by weight of acetylene black, and 8.3 parts by weight of PVDF (polyfluorovinilidene), as well as NMP (N-methylpyrrolidone). The obtained slurry was coated onto both sides of an expanded copper foil, dried and pressed to obtain a negative electrode body having a thickness of the negative active material layer of 60 μm. Onto one side of the both-side negative electrode body, a lithium metal foil corresponding to 760 mAh/g per unit weight of the composite porous material 1 was pasted.

[Preparation of Separator]
Separator 1

As a pure polymer, homopolymers of polyethylene having My of 250,000 and 700,000 were prepared in each ratio of 50:50 in weight ratio. By adding 1.0% by weight of pentaerythrityl-tetrakis-[3-(3,5-di-t-butyl-4-hydroxyphenyl) propionate], as an antioxidant, to 99% by weight of the above-described pure polymer, and by dry-blending them using a tumbler-blender, a mixture of the polymer, etc., was obtained. The obtained mixture of the polymer, etc., was supplied into a twin-screw extruder, whose inside was replaced with nitrogen, by a feeder under nitrogen atmosphere. In addition, liquid paraffin, as a plasticizer, was injected into a cylinder of the extruder by a plunger pump. Melt kneading was carried out using the twin-screw extruder, and the feeder and the pump were adjusted so that an amount ratio of liquid paraffin occupying in the whole extruded mixture is 68% by weight (i.e., amount ratio of the mixture of the polymer, etc., is 32% by weight). Melt kneading conditions were: a setting temperature of 200° C., a screw rotation number of 100 rpm, and a discharge quantity of 12 kg/h.

Subsequently, by extruding and casting the obtained melt kneaded product on a cooling roll controlled at a surface temperature of 40° C., via a T-die, a gel sheet having a thickness of 1600 μm was obtained.

Next, the obtained gel sheet was introduced to a simultaneous biaxial tenter drawing machine to carry out biaxial drawing to obtain a stretched sheet. Drawing conditions set were: a draw ratio in the MD of 7.0 times, a draw ratio in the TD of 6.1 times, and a set temperature of 121° C.

Next, the stretched sheet was introduced into a methyl ethyl ketone tank to sufficiently immerse into methyl ethyl ketone, and liquid paraffin was removed by extraction from the stretched sheet and then methyl ethyl ketone was removed by drying.

Next, the stretched sheet, from which methyl ethyl ketone was removed by drying, was introduced to a TD tenter to carry out heat setting. Heat setting temperature was set at 121° C., TD maximum magnification was set at 2.0 times, and relaxation rate was set at 0.90 times. Evaluation results of various characteristics of the microporous membrane separator 1 obtained in this way are shown in Table 1, together with composition thereof.

[Preparation of Electrolytic Solution]

A solution obtained by dissolving $LiPF_6$ in a concentration of 1 mol/l into a solvent, where ethylene carbonate (EC) and methyl ethyl carbonate (MEC) were mixed in a weight ratio of 1 to 4, was used as the electrolytic solution.

[Assembly of Capacitor]

The obtained one-side positive electrode, both-sides positive electrode body and both-sides negative electrode body were cut into 100 mm×100 mm. Next, by using the one side positive electrode body at the uppermost surface and the undermost surface; and at the intermediate part, by laminating alternately 20 pieces of the both-sides negative electrode body and 19 pieces of the both-sides positive electrode body, via the microporous membrane separator 1; and then by contacting the electrode terminal to the negative electrode body and the positive electrode body, an electrode laminate was obtained. The electrode laminate was inserted into an outer casing consisting of a laminate film, and the above-described electrolytic solution was injected into the outer casing, with the end part of the electrode terminal being pulled out of the outer casing, to seal the outer casing and to assemble the lithium ion capacitor. In this case, $X^1$ and $X^2$ were both 1.0.

[Heating Test and Characteristics Evaluation]

A heating test of the capacitor prepared was carried out. Charging was carried out up to 4.0 V at a current value of 2C, and then constant current and constant voltage charging was carried out for 2 hours, where a constant voltage of 4.0 V was applied. Next, a thermocouple was pasted using a polyimide tape at the center part of one side of the capacitor, and was sandwiched between metal sheets, and was used as a heating medium by winding a ribbon heater thereon, and set in a thermostatic bath under air atmosphere. The setting temperature increasing rate of the ribbon heater was set to be 5° C./min., and voltage and temperature of the capacitor were measured. Short circuit starting temperature was 128° C. and dead-short-circuit temperature was 138° C., and at the time over 200° C., the capacitor was opened without rupturing and igniting, and very little gas jetting was observed.

The capacitor prepared was charged up to 3.8 V by constant current and constant voltage charging, in which a constant voltage charging can be secured in a current value of 1.5C for 1 hour, and then constant current discharging was carried out down to 2.2 V similarly under a current value of 1.5C. It was found that capacitance of the present capacitor was 1200 F, from capacity and voltage change at that time.

The capacitor prepared was subjected to characteristics evaluation under an environment of 25° C. It was charged up to 4.0 V under a current value of 1C, and then constant current and constant voltage charging was carried out for 2 hours, by applying a constant voltage of 4.0 V. Subsequently, it was discharged down to 2.0 V under a current value of 1C. Next, charging similar to the above was carried out for 2 hours, and it was then discharged down to 2.0 V under a current value of 300C. Ratio of discharge capacity under 300C to discharge capacity under 1C was 82%. Next, characteristics evaluation was carried out under an environment of −20° C. Charging similar to the above was carried out, and it was discharged down to 2.0 V under a current value of 200C. Ratio of discharge capacity at −20° C. under 200C to discharge capacity at 25° C. under 1C was 55%.

Example 1-2

Preparation of Positive Electrode Body

Figure 2:
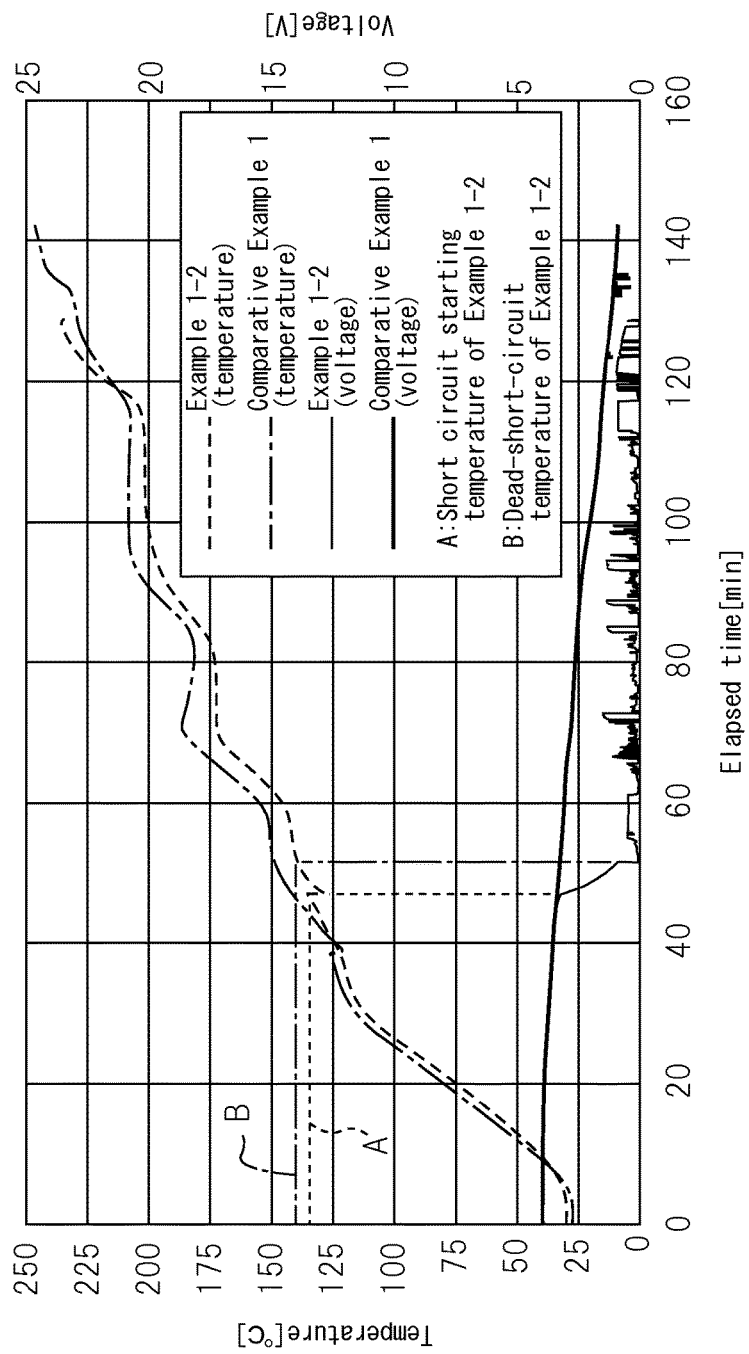
FIG. 2 is a graph for comparing heating test results of the lithium ion capacitor in embodiment of the present invention and a conventional lithium ion capacitor.

It was prepared similarly as in Example 1-1.
[Preparation of Negative Electrode Body]
It was prepared similarly as in Example 1-1.
[Preparation of Separator]
It was prepared similarly as in Example 1-1.
[Preparation of Electrolytic Solution]
It was prepared similarly as in Example 1-1.
[Assembly of Capacitor]
A lithium ion capacitor was assembled under similar condition as in Example 1-1, except that $X^1$ and $X^2$ were both made 4.0.
[Heating Test and Characteristics Evaluation]
A heating test of the capacitor prepared was carried out, and found that short circuit starting temperature was 133° C., dead-short-circuit temperature was 143° C., and at the time over 200° C., the capacitor was opened without rupturing and igniting, and very little gas jetting was observed. Voltage and temperature of the capacitor prepared were measured. Test results are shown in FIG. 2.

Characteristics evaluation of the capacitor prepared was carried out under an environment of 25° C. It was charged up to 4.0 V at a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 82%. Next, characteristics evaluation was carried out under an environment of −20° C. Charging similar to the above was carried out, and it was discharged down to 2.0 V under a current value of 200C. Ratio of discharge capacity at −20° C. under 200C to discharge capacity at 25° C. under 1C was 55%.

Example 1-3

Preparation of Positive Electrode Body

It was prepared similarly as in Example 1-1.
[Preparation of Negative Electrode Body]
It was prepared similarly as in Example 1-1.
[Preparation of Separator]
It was prepared similarly as in Example 1-1.
[Preparation of Electrolytic Solution]
It was prepared similarly as in Example 1-1.
[Assembly of a Capacitor]
A lithium ion capacitor was assembled under similar condition as in Example 1-1, except that $X^1$ and $X^2$ were both made 7.5.
[Heating Test and Characteristics Evaluation]
A heating test of the capacitor prepared was carried out, and found that short circuit starting temperature was 133° C., dead-short-circuit temperature was 149° C., at the time over 200° C., the capacitor was opened without rupturing and igniting, and very little gas jetting was observed.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 82%. Next, characteristics evaluation was carried out under an environment of −20° C. It was charged similarly above, and it was discharged down to 2.0 V under a current value of 200C. Ratio of discharge capacity at −20° C. under 200C to discharge capacity at 25° C. under 1C was 55%.

Example 2-1

Preparation of Positive Electrode Body

It was prepared similarly as in Example 1-1.
[Preparation of Negative Electrode Body]
It was prepared similarly as in Example 1-1.
[Preparation of Separator]
Separator 2
As a pure polymer, a homopolymer of polyethylene having Mv of 250,000 was prepared. Hereafter, the separator 2 was prepared by a similar method as in Example 1-1. However, setting drawing condition was: draw ratio of the MD of 5.0 times, draw ratio of the TD of 5.0 times, and setting temperature of 121° C. In addition, a heat setting temperature of 120° C., TD maximum magnification of 2.4 times, and a relaxation rate of 0.85 times were adopted. Evaluation results of various characteristics of the microporous membrane separator 2 obtained in this way are shown in Table 1, together with composition thereof, etc.
[Preparation of an Electrolytic Solution]
It was prepared similarly as in Example 1-1.
[Assembly of a Capacitor]
A lithium ion capacitor was assembled under similar condition as in Example 1-1, using the obtained microporous membrane separator 2.
[Heating Test and Characteristics Evaluation]
A heating test of the capacitor prepared was carried out, and found that short circuit starting temperature was 131° C., dead-short-circuit temperature was 143° C., at the time over 200° C., the capacitor was opened without rupturing and igniting, and very little gas jetting was observed.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 81%. Next, characteristics evaluation was carried out under an environment of −20° C. It was charged similarly above, and discharged down to 2.0 V under a current value of 200C. Ratio of discharge capacity at −20° C. under 200C to discharge capacity at 25° C. under 1C was 53%.

Example 2-2

Preparation of Positive Electrode Body

It was prepared similarly as in Example 1-1.
[Preparation of Negative Electrode Body]
It was prepared similarly as in Example 1-1.
[Preparation of Separator]
It was prepared similarly as in Example 2-1.
[Preparation of an Electrolytic Solution]
It was prepared similarly as in Example 1-1.
[Assembly of Capacitor]
A lithium ion capacitor was assembled under similar condition as in Example 2-1, except that $X^1$ and $X^2$ were both made 4.0.
[Heating Test and Characteristics Evaluation]
A heating test of the capacitor prepared was carried out, and found that short circuit starting temperature was 132° C., dead-short-circuit temperature was 145° C., at the time over 200° C., the capacitor was opened without rupturing and igniting, and very little gas jetting was observed.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 81%. Next, characteristics evaluation was carried out under an environment of −20° C. It was charged similarly above, and discharged down to 2.0 V under a current value of 200C. Ratio of discharge capacity at −20° C. under 200C to discharge capacity at 25° C. under 1C was 53%.

Example 2-3

Preparation of Positive Electrode Body

It was prepared similarly as in Example 1-1.
[Preparation of Negative Electrode Body]
It was prepared similarly as in Example 1-1.
[Preparation of Separator]
It was prepared similarly as in Example 2-1.
[Preparation of Electrolytic Solution]
It was prepared similarly as in Example 1-1.
[Assembly of Capacitor]
A lithium ion capacitor was assembled under similar condition as in Example 2-1, except that $X^1$ and $X^2$ were both made 7.5.
[Heating Test and Characteristics Evaluation]
A heating test of the capacitor prepared was carried out, and found that short circuit starting temperature was 130° C., dead-short-circuit temperature was 150° C., at the time over 200° C., the capacitor was opened without rupturing and igniting, and very little gas jetting was observed.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 81%. Next, characteristics evaluation was carried out under an environment of −20° C. It was charged similarly above, and discharged down to 2.0 V under a current value of 200C. Ratio of discharge capacity at −20° C. under 200C to discharge capacity at 25° C. under 1C was 53%.

Example 3-1

Preparation of Positive Electrode Body

It was prepared similarly as in Example 1-1.
[Preparation of Negative Electrode Body]
It was prepared similarly as in Example 1-1.
[Preparation of Separator]
Separator 3
The separator 3 was prepared by a similar method as in Example 1. However, a relaxation rate of heat setting of 1.0 times was adopted (i.e., not relaxed). Evaluation results of various characteristics of the microporous membrane separator 3 obtained in this way are shown in Table 1, together with composition thereof, etc.
[Preparation of Electrolytic Solution]
It was prepared similarly as in Example 1-1.
[Assembly of Capacitor]
A lithium ion capacitor was assembled under similar condition as in Example 1-1, using the obtained microporous membrane separator 3.
[Heating Test and Characteristics Evaluation]
A heating test of the capacitor prepared was carried out, and found that short circuit starting temperature was 123° C., dead-short-circuit temperature was 131° C., at the time over 200° C., the capacitor was opened without rupturing and igniting, and very little gas jetting was observed.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 84%. Next, characteristics evaluation was carried out under an environment of −20° C. It was charged similarly above, and discharged down to 2.0 V under a current value of 200C. Ratio of discharge capacity at −20° C. under 200C to discharge capacity at 25° C. under 1C was 56%.

Example 3-2

Preparation of Positive Electrode Body

It was prepared similarly as in Example 1-1.
[Preparation of Negative Electrode Body]
It was prepared similarly as in Example 1-1.
[Preparation of Separator]
It was prepared similarly as in Example 3-1.
[Preparation of Electrolytic Solution]
It was prepared similarly as in Example 1-1.
[Assembly of Capacitor]
A lithium ion capacitor was assembled under similar condition as in Example 3-1, except that $X^1$ and $X^2$ were both made 4.0.

[Heating Test and Characteristics Evaluation]

A heating test of the capacitor prepared was carried out, and found that short circuit starting temperature was 129° C., dead-short-circuit temperature was 139° C., at the time over 200° C., the capacitor was opened without rupturing and igniting, and very little gas jetting was observed.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 84%. Next, characteristics evaluation was carried out under an environment of −20° C. It was charged similarly above, and discharged down to 2.0 V under a current value of 200C. Ratio of discharge capacity at −20° C. under 200C to discharge capacity at 25° C. under 1C was 56%.

Example 3-3

Preparation of Positive Electrode Body

It was prepared similarly as in Example 1-1.
[Preparation of Negative Electrode Body]
It was prepared similarly as in Example 1-1.
[Preparation of Separator]
It was prepared similarly as in Example 3-1.
[Preparation of Electrolytic Solution]
It was prepared similarly as in Example 1-1.
[Assembly of Capacitor]

A lithium ion capacitor was assembled under similar condition as in Example 3-1, except that $X^1$ and $X^2$ were both made 7.5.

[Heating Test and Characteristics Evaluation]

A heating test of the capacitor prepared was carried out, and found that short circuit starting temperature was 130° C., dead-short-circuit temperature was 144° C., at the time over 200° C., the capacitor was opened without rupturing and igniting, and very little gas jetting was observed.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 84%. Next, characteristics evaluation was carried out under an environment of −20° C. It was charged similarly above, and discharged down to 2.0 V under a current value of 200C. Ratio of discharge capacity at −20° C. under 200C to discharge capacity at 25° C. under 1C was 56%.

Comparative Example 1

Preparation of Positive Electrode Body

It was prepared similarly as in Example 1-1.
[Preparation of Negative Electrode Body]
It was prepared similarly as in Example 1-1.
[Preparation of Electrolytic Solution]
It was prepared similarly as in Example 1-1.
[Assembly of Capacitor]

A lithium ion capacitor was assembled under similar condition as in Example 1-2, using the cellulose paper separator 4 (evaluation results of various characteristics are shown in Table 1).

[Heating Test and Characteristics Evaluation]

A heating test of the capacitor prepared, and even when it reached 200° C., short circuit was not initiated, and power was held, and the capacitor was opened without rupturing and igniting, however, weak gas jetting was recognized.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 78%. Next, characteristics evaluation was carried out under an environment of −20° C. It was charged similarly above, and then discharged down to 2.0 V under a current value of 200C. Ratio of discharge capacity at −20° C. under 200C to discharge capacity at 25° C. under 1C was 49%.

Comparative Example 2-1

Preparation of Positive Electrode Body

It was prepared similarly as in Example 1-1.
[Preparation of Negative Electrode Body]
It was prepared similarly as in Example 1-1.
[Preparation of Separator]
Separator 5

As a pure polymer, a homopolymer of polypropylene having Mv of 200,000 was prepared. Hereafter, the separator 5 was prepared by a similar method as in Example 1. However, setting drawing condition was: draw ratio of the MD of 5.0 times, a draw ratio of the TD of 5.0 times, and temperature set of 130° C. In addition, a heat setting temperature of 140° C., TD maximum magnification of 1.8 times, and a relaxation rate of 0.85 times were adopted. Evaluation results of various characteristics of the microporous membrane separator 5 obtained in this way are shown in Table 1, together with composition thereof, etc.

[Preparation of Electrolytic Solution]
It was prepared similarly as in Example 1-1.
[Assembly of Capacitor]

A lithium ion capacitor was assembled under similar condition as in Example 1-1, except for using the obtained microporous membrane separator 5, and still more making $X^1$ and $X^2$ both 0.3.

[Heating Test and Characteristics Evaluation]

A heating test of the capacitor prepared was carried out, and found that short circuit starting temperature was 175C, that dead-short-circuit temperature was not attained, although gradual voltage decrease was confirmed hereafter, and that at the time over 200° C., the capacitor was opened without rupturing and igniting, however, strong gas jetting was recognized.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 67%. Next, characteristics evaluation was carried out under an environment of −20° C. It was charged similarly above, and then discharged down to 2.0 V under a current value of 200C. Ratio of discharge capacity at −20° C. under 200C to discharge capacity at 25° C. under 1C was 28%.

Comparative Example 2-2

Preparation of Positive Electrode Body

It was prepared similarly as in Example 1-1.
[Preparation of Negative Electrode Body]
It was prepared similarly as in Example 1-1.
[Preparation of Separator]
It was prepared similarly as in Comparative Example 2-1.
[Preparation of Electrolytic Solution]
It was prepared similarly as in Example 1-1.
[Assembly of Capacitor]
A lithium ion capacitor was assembled under similar condition as in Comparative Example 2-1, except that $X^1$ and $X^2$ were both made 4.0.
[Heating Test and Characteristics Evaluation]
A heating test of the capacitor prepared was carried out, and found that short circuit starting temperature was 175C, that dead-short-circuit temperature was not attained, although gradual voltage decrease was confirmed hereafter, and that at the time over 200° C., the capacitor was opened without rupturing and igniting; however, strong gas jetting was recognized.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 67%. Next, characteristics evaluation was carried out under an environment of −20° C. It was charged similarly above, and then discharged down to 2.0 V under a current value of 200C. Ratio of discharge capacity at −20° C. under 200C to discharge capacity at 25° C. under 1C was 28%.

Comparative Example 2-3

Preparation of Positive Electrode Body

It was prepared similarly as in Example 1-1.
[Preparation of Negative Electrode Body]
It was prepared similarly as in Example 1-1.
[Preparation of Separator]
It was prepared similarly as in Comparative Example 2-1.
[Preparation of Electrolytic Solution]
It was prepared similarly as in Example 1-1.
[Assembly of Capacitor]
A lithium ion capacitor was assembled under similar condition as in Comparative Example 2-1, except that $X^1$ and $X^2$ were both made 11.
[Heating Test and Characteristics Evaluation]
A heating test of the capacitor prepared was carried out, and found that short circuit starting temperature was 175C, that dead-short-circuit temperature was not attained, although gradual voltage decrease was confirmed hereafter, and that at the time over 200° C., the capacitor was opened without rupturing and igniting; however, strong gas jetting was recognized.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 67%. Next, characteristics evaluation was carried out under an environment of −20° C. It was charged similarly above, and then discharged down to 2.0 V under a current value of 200C. Ratio of discharge capacity at −20° C. under 200C to discharge capacity at 25° C. under 1C was 28%.

Comparative Example 3

Preparation of Positive Electrode Body

It was prepared similarly as in Example 1-1.
[Preparation of Negative Electrode Body]
It was prepared similarly as in Example 1-1.
[Preparation of Separator]
It was prepared similarly as in Example 1-1.
[Preparation of Electrolytic Solution]
It was prepared similarly as in Example 1-1.
[Assembly of Capacitor]
A lithium ion capacitor was assembled under similar condition as in Example 1-1, except that $X^1$ and $X^2$ were both made 11.
[Heating Test and Characteristics Evaluation]
A heating test of the capacitor prepared was carried out, and found that short circuit starting temperature was 140° C., dead-short-circuit temperature was 175° C., and at the time over 200° C., the capacitor was opened without rupturing and igniting; however, strong gas jetting was recognized.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 82%. Next, characteristics evaluation was carried out under an environment of −20° C. It was charged similarly above, and then discharged down to 2.0 V under a current value of 200C. Ratio of discharge capacity at −20° C. under 200C to discharge capacity at 25° C. under 1C was 55%.

Comparative Example 4

Preparation of Positive Electrode Body

It was prepared similarly as in Example 1-1.
[Preparation of Negative Electrode Body]
It was prepared similarly as in Example 1-1.
[Preparation of Separator]
It was prepared similarly as in Example 1-1.
[Preparation of Electrolytic Solution]
It was prepared similarly as in Example 1-1.
[Assembly of Capacitor]
A lithium ion capacitor was assembled under similar condition as in Example 1-1, except that $X^1$ and $X^2$ were both made 0.3.
[Heating Test and Characteristics Evaluation]
A heating test of the capacitor prepared, and found that short circuit starting temperature was 95° C., dead-short-circuit temperature was 109° C., and at the time over 200° C., the capacitor was opened without rupturing and igniting; however, gas jetting was recognized.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 82%. Next, characteristics evaluation was carried out under an environment of −20° C. It was charged similarly above, and then discharged down to 2.0 V under a current value of 200C. Ratio of discharge capacity at −20° C. under 200C to discharge capacity at 25° C. under 1C was 55%.

Comparative Example 5-1

Preparation of Positive Electrode Body

It was prepared similarly as in Example 1-1.
[Preparation of Negative Electrode Body]
It was prepared similarly as in Example 1-1.
[Preparation of Separator]
Separator 6
The separator 6 was prepared by a similar method as in Example 1. However, the preparation was completed up to the biaxial drawing, extrusion and drying steps, and the heat setting was not carried out. Evaluation results of various characteristics of the microporous membrane separator 6 obtained in this way are shown in Table 1, together with composition thereof, etc.

[Preparation of Electrolytic Solution]
It was prepared similarly as in Example 1-1.
[Assembly of Capacitor]
A lithium ion capacitor was assembled under similar condition as in Example 1-1, except for using the obtained microporous membrane separator 6, and still more making $X^1$ and $X^2$ both 0.3.
[Heating Test and Characteristics Evaluation]
A heating test of the capacitor prepared, and found that short circuit starting temperature was 91° C., dead-short-circuit temperature was 105° C., and at the time over 200° C., the capacitor was opened without rupturing and igniting, however, gas jetting was recognized.

Characteristics Evaluation of the Capacitor Prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 80%. Next, characteristics evaluation was carried out under an environment of −20° C. It was charged similarly above, and then discharged down to 2.0 V under a current value of 200C. Ratio of discharge capacity at −20° C. under 200C to discharge capacity at 25° C. under 1C was 50%.

Comparative Example 5-2

Preparation of Positive Electrode Body

It was prepared similarly as in Example 1-1.
[Preparation of Negative Electrode Body]
It was prepared similarly as in Example 1-1.
[Preparation of Separator]
It was prepared similarly as in Comparative Example 5-1.
[Preparation of Electrolytic Solution]
It was prepared similarly as in Example 1-1.
[Assembly of Capacitor]
A lithium ion capacitor was assembled under similar condition as in Comparative Example 5-1, except that $X^1$ and XZ were both made 4.0.
[A Heating Test and Characteristics Evaluation]
A heating test of the capacitor prepared, and found that short circuit starting temperature was 93° C., dead-short-circuit temperature was 107° C., and at the time over 200° C., the capacitor was opened without rupturing and igniting; however, strong gas jetting was recognized.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 80%. Next, characteristics evaluation was carried out under an environment of −20° C. It was charged similarly above, and then discharged down to 2.0 V under a current value of 200C. Ratio of discharge capacity at −20° C. under 200C to discharge capacity at 25° C. under 1C was 50%.

Comparative Example 5-3

Preparation of Positive Electrode Body

It was prepared similarly as in Example 1-1.
[Preparation of Negative Electrode Body]
It was prepared similarly as in Example 1-1.
[Preparation of Separator]
It was prepared similarly as in Comparative Example 5-1.
[Preparation of an Electrolytic Solution]
It was prepared similarly as in Example 1-1.
[Assembly of Capacitor]
A lithium ion capacitor was assembled under similar condition as in Comparative Example 5-1, except that $X^1$ and $X^2$ were both made 11.
[Heating Test and Characteristics Evaluation]
A heating test of the capacitor prepared, and found that short circuit starting temperature was 135° C., dead-short-circuit temperature was 165° C., and at the time over 200° C., the capacitor was opened without rupturing and igniting; however, strong gas jetting was recognized.

Characteristics evaluation of the capacitor prepared was carried out under an environment of 25° C. It was charged up to 4.0 V under a current value of 1C, and then constant current and constant voltage charging was carried out for 2 hours, where a constant voltage of 4.0 V was applied. Subsequently, it was discharged down to 2.0 V under a current value of 1C. Next, the same charging as above was carried out for 2 hours, and it was then discharged down to 2.0 V under a current value of 300C. Ratio of discharge capacity under 300C to discharge capacity under 1C was 80%. Next, characteristics evaluation was carried out under an environment of −20° C. It was charged similarly above, and then discharged down to 2.0 V under a current value of 200C. Ratio of discharge capacity at −20° C. under 200C to discharge capacity at 25° C. under 1C was 50%.

As understood from the above-described Examples and Comparative Examples, in the lithium ion capacitor of the present invention, by using a separator having high thermal shrinkage at high temperature, safe and instantaneous short-circuit can be attained by meltdown thereof, and a safe capacitor, and it is possible to provide the capacitor which has no risk of rupturing or igniting in thermal runaway by consuming power at relatively low temperature.

TABLE 1

| | Separator | | | | | | Capacitor | | |
|---|---|---|---|---|---|---|---|---|---|
| | Polymer type | Thermal shrinkage at 100° C. · 1 hr (%) ND/TD | Film thickness (μm) | Porosity (%) | Pore size (μm) | Pore number (piece/μm²) | Brugmann index | $X^1$ $X^2$ | Output characteristics (25° C.) Efficiency (%) at 300 C to 1 C | Output characteristics (−20° C.) Efficiency (%) at 200 C to 1 C | 1) Short circuit starting temperature (° C.) 2) Dead-short-circuit temperature (° C.) 3) Temperature difference (° C.) 4) Cell state in unsealing |
| Example 1-1 | PE, Mw250,000 (50 wt %) | 7/4 | 16 | 62 | 0.05 | 170 | 2.6 | 1.0 1.0 | 82 | 55 | 1) 128, 2) 138, 3) 10 4) little gas jet |
| Example 1-2 | PE, Mw700,000 (50 wt %) | | | | | | | 4.0 4.0 | 82 | 55 | 1) 133, 2) 143, 3) 10 4) little gas jet |
| Example 1-3 | | | | | | | | 7.5 7.5 | 82 | 55 | 1) 133, 2) 149, 3) 16 4) little gas jet |
| Example 2-1 | PE, Mw250,000 (100 wt %) | 4/2 | 20 | 62 | 0.06 | 125 | 3.0 | 1.0 1.0 | 81 | 53 | 1) 131, 2) 143, 3) 12 4) little gas jet |
| Example 2-2 | | | | | | | | 4.0 4.0 | 81 | 53 | 1) 132, 2) 145, 3) 13 4) little gas jet |
| Example 2-3 | | | | | | | | 7.5 7.5 | 81 | 53 | 1) 130, 2) 150, 3) 20 4) little gas jet |
| Example 3-1 | PE, Mw250,000 (50 wt %) PE, Mw700,000 (50 wt %) | 10/9 | 15 | 64 | 0.05 | 175 | 2.4 | 1.0 1.0 | 84 | 56 | 1) 123, 2) 131, 3) 8 4) little gas jet |
| Example 3-2 | | | | | | | | 4.0 4.0 | 84 | 56 | 1) 129, 2) 139, 3) 10 4) little gas jet |
| Example 3-3 | | | | | | | | 7.5 7.5 | 84 | 56 | 1) 130, 2) 144, 3) 14 4) little gas jet |
| Comparative Example 1 | cellulose paper | 0.6/0.5 | 35 | 75 | 0.5 | 20 | 4.6 | 4.0 4.0 | 78 | 49 | 1) — 2) No short circuit till unsealing 3) — 4) weak gas jet |
| Comparative Example 2-1 | PE, Mw200,000 (100 wt %) | 0.5/0.5 | 20 | 52 | 0.15 | 80 | 4.1 | 0.3 0.3 | 67 | 28 | 1) 175 2) Dead-short-circuit was not attaind in unsealing. 3) — 4) strong gas jet |
| Comparative Example 2-2 | | | | | | | | 4.0 4.0 | 67 | 28 | 1) 175 2) Dead-short-circuit was not attaind in unsealing. 3) — 4) strong gas jet |
| Comparative Example 2-3 | | | | | | | | 11 11 | 67 | 28 | 1) 175 2) Dead-short-circuit was not attaind in unsealing. |

TABLE 1-continued

| | Separator | | | | | | | Capacitor | | |
|---|---|---|---|---|---|---|---|---|---|---|
| | Polymer type | Thermal shrinkage at 100° C. · 1 hr (%) ND/TD | Film thickness (μm) | Porosity (%) | Pore size (μm) | Pore number (piece/ μm²) | Brugmann index | $X^1$ $X^2$ | Output characteristics (25° C.) Efficiency (%) at 300 C to 1 C | Output characteristics (−20° C.) Efficiency (%) at 200 C to 1 C | 1) Short circuit starting temperature (° C.) 2) Dead-short-circuit temperature (° C.) 3) Temperature difference (° C.) 4) Cell state in unsealing |
| Comparative Example 3 | | The same as in Example 1 | | | | | | 11 11 | 82 | 55 | 3) — 4) strong gas jet 1) 140, 2) 175, 3) 35 4) strong gas jet |
| Comparative Example 4 | | The same as in Example 1 | | | | | | 0.3 0.3 | 82 | 55 | 1) 95, 2) 109, 3) 14 4) gas jet |
| Comparative Example 5-1 | PE, Mw250,000 (50 wt %) | 18/18 | 22 | 53 | 0.04 | 240 | 2.8 | 0.3 0.3 | 80 | 50 | 1) 91, 2) 105, 3) 14 4) gas jet |
| Comparative Example 5-2 | PE, | | | | | | | 4.0 4.0 | 80 | 50 | 1) 93, 2) 107, 3) 14 4) strong gas jet |
| Comparative Example 5-3 | Mw700,000 (50 wt %) | | | | | | | 11 11 | 80 | 50 | 1) 135, 2) 165, 3) 30 4) strong gas jet |

INDUSTRIAL APPLICABILITY

The lithium ion capacitor of the present invention can be utilized suitably as an electrical storage element, etc., for a hybrid drive system.

REFERENCE SYMBOLS LIST

A: In an arbitrary straight line, which is parallel to the first direction of the separator, length of a portion, where electrode area in the arbitrary straight line and separator overlap
$L_1$: Length of a portion, where electrode area and separator do not overlap
$L_1'$: Length of a portion, where electrode area and separator do not overlap
1: Separator
2: Larger electrode of any of area of the positive electrode active material layer of the positive electrode body, or negative electrode area of the negative electrode active material layer of the negative electrode body
3: Current collector in Electrode 2 (site that active material layer is not applied)

The invention claimed is:
1. A lithium ion capacitor comprising, having stored within an outer casing:
an electrode laminate obtained by laminating
a negative electrode body;
a separator comprising a polyolefin resin including a polyethylene; and
a positive electrode body; and
a non-aqueous electrolytic solution including a lithium ion-containing electrolyte,
wherein
in said negative electrode body, a negative electrode active material layer comprising a carbon material as a negative electrode active material is placed on a negative electrode current collector,
wherein
in said positive electrode body, a positive electrode active material layer comprising a carbon material or a carbon compound material as a positive electrode active material is placed on a positive electrode current collector,
wherein
when said separator is maintained at 100° C. over 1 hour in an unconstrained state, said separator has a thermal shrinkage of 3% to 10% in a first direction, and a thermal shrinkage of 2% to 10% in a second direction which is orthogonal to the first direction,
wherein
a larger electrode area which is any one of an area of the positive electrode active material layer of said positive electrode body or a negative electrode area of the negative electrode active material layer of said negative electrode body, and an area of said separator have a following relationship

(separator area)>(electrode area); and wherein
$X^1$ and $X^2$ are both 0.5 to 3.0,
wherein $X^1$ is calculated by the formula (1):

$$X^1 = \{L_1 \text{ or } L_1'/(A/2)\} \times 100$$

wherein, in an arbitrary straight line which is parallel to the first direction of said separator and makes any one of $L_1$ and $L_1'$ the shortest, in a top view, A is a length of a portion where said electrode area in said arbitrary straight line and said separator overlap, and $L_1$ and $L_1'$ are lengths of portions where said electrode area and said separator do not overlap; and
wherein $X^2$ is calculated by the formula (2):

$$X^2 = \{L_2 \text{ or } L_2'/(B/2)\} \times 100$$

wherein, in an arbitrary straight line which is parallel to the second direction of said separator and makes any one of $L_2$ and $L_2'$ the shortest, in a top view, B is a length of a portion where said electrode area in said arbitrary straight line and said separator overlap, and $L_2$ and $L_2'$ are lengths of portions where said electrode area and said separator do not overlap.

2. The lithium ion capacitor according to claim 1, wherein pore size of said separator is 0.01 μm to 0.1 μm, and a number of pores is 100 pores/μm² to 250 pores/μm².

3. The lithium ion capacitor according to claim 1, wherein Brugmann index measured and calculated using methyl ethyl carbonate of said separator as a probe molecule is 2.0 to 3.0.

4. The lithium ion capacitor according to claim 1, wherein membrane thickness of said separator is 5 μm to 35 μm, and porosity is 30% to 75%.

5. The lithium ion capacitor according to claim 1, wherein said separator consists of polyethylene.

6. The lithium ion capacitor according to claim 1, wherein capacitance is 1000 F or more.

7. The lithium ion capacitor according to claim 1, wherein said negative electrode active material is formed by depositing a carbon material on the surface of an activated carbon, and is a composite porous material which satisfies $$0.01 \leq Vm1 \leq 0.250,$$

$$0.001 \leq Vm2 \leq 0.200 \text{ and}$$

$$1.5 \leq Vm1/Vm2 \leq 20.0$$

provided that, mesopore volume derived from a pore having a diameter of 20 Å to 500 Å calculated by a BJH method is Vm1 (cc/g), and micro-pore volume derived from a pore having a diameter of smaller than 20 Å calculated by a MP method is Vm2 (cc/g).

8. The lithium ion capacitor according to claim 1, wherein said positive electrode active material is activated carbon which satisfies $$0.3 < V1 \leq 0.8 \text{ and}$$

$$0.5 \leq V2 \leq 1.0,$$

provided that, mesopore volume derived from a pore having a diameter of 20 Å to 500 Å calculated by the BJH method is V1 (cc/g), and micro-pore volume derived from a pore having a diameter of smaller than 20 Å calculated by the MP method is V2 (cc/g), and a specific surface area measured by the BET method is 1500 m$^2$/g to 3000 m$^2$/g.

9. The lithium ion capacitor according to claim 1, wherein said lithium ion capacitor has a short circuit starting temperature from 120° C. to 150° C. and a dead-short-circuit temperature from 120° C. to 150° C., and a difference between said short circuit starting temperature and said dead-short-circuit temperature is 20° C. or less, when said lithium ion capacitor is heated in an environment in which a temperature is increased from 30° C. or less at a rate of 5° C./min.

10. The lithium ion capacitor according to claim 1, wherein said carbon material of the negative electrode active material intercalates and deintercalates lithium ions.

11. The lithium ion capacitor according to claim 1, wherein $X^1$ and $X^2$ are both 0.5 to 1.0.

* * * * *